United States Patent [19]
Oshima et al.

[11] Patent Number: 5,794,090
[45] Date of Patent: Aug. 11, 1998

[54] ZOOM LENS

[75] Inventors: Shigeru Oshima, Kanagawa-ken; Takashi Kamai, Tokyo; Yoshiharu Nakamura; Yasuhiro Izumi, both of Kanagawa-ken, all of Japan

[73] Assignee: Canon Kabushiki Kaisha, Tokyo, Japan

[21] Appl. No.: 692,123

[22] Filed: Aug. 5, 1996

Related U.S. Application Data

[63] Continuation of Ser. No. 189,170, Jan. 31, 1994, abandoned.

[30] Foreign Application Priority Data

Feb. 1, 1993 [JP] Japan .................... 5-014858
Jul. 29, 1993 [JP] Japan .................... 5-207056

[51] Int. Cl.$^6$ .................................... G03B 17/00
[52] U.S. Cl. .................................... 396/435
[58] Field of Search .................... 396/133, 89, 435

[56] References Cited

U.S. PATENT DOCUMENTS

| | | | |
|---|---|---|---|
| 4,038,673 | 7/1977 | Schroder | 354/222 |
| 4,110,005 | 8/1978 | Bohm et al. | 350/184 |
| 4,225,219 | 9/1980 | Shimiza | 354/25 |
| 4,264,151 | 4/1981 | Okano | 350/422 |
| 4,482,228 | 11/1984 | Fujita | 354/195.12 |
| 4,814,811 | 3/1989 | Saito et al. | 354/412 |
| 4,840,466 | 6/1989 | Yamada et al. | 35/422 |
| 4,843,475 | 6/1989 | Imai | 358/225 |
| 4,913,537 | 4/1990 | Takase | 350/422 |
| 4,953,029 | 8/1990 | Morimoto et al. | 358/229 |
| 5,091,802 | 2/1992 | Imaoka et al. | 359/694 |
| 5,136,431 | 8/1992 | Terasawa et al. | 359/684 |
| 5,204,779 | 4/1993 | Nakata et al. | 359/688 |
| 5,227,824 | 7/1993 | Yoshida | 354/195.12 |
| 5,414,563 | 5/1995 | Katoh et al. | 348/207 |
| 5,420,632 | 5/1995 | Yamagiwa | 348/240 |
| 5,574,523 | 11/1996 | Nakayama et al. | 396/435 |

FOREIGN PATENT DOCUMENTS 2-262113 10/1990 Japan.

*Primary Examiner*—Safet Metjahic
*Assistant Examiner*—Christopher E. Mahoney
*Attorney, Agent, or Firm*—Fitzpatrick, Cella, Harper & Scinto

[57] ABSTRACT

For a camera of the kind permitting change-over of the aspect ratio of its image pickup area from one aspect ratio to another, an optical system and an apparatus using the optical system are arranged to be capable of preventing the angle of view of a zoom lens from being changed by the change-over of the aspect ratio.

25 Claims, 21 Drawing Sheets

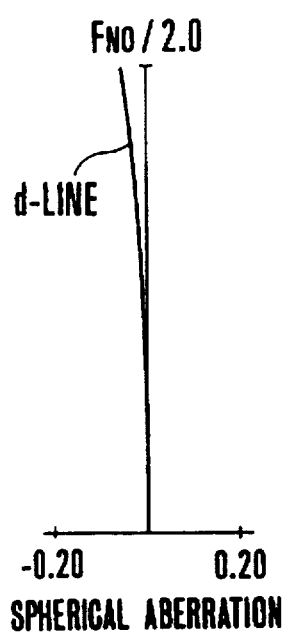
FIG.4(A)(1)
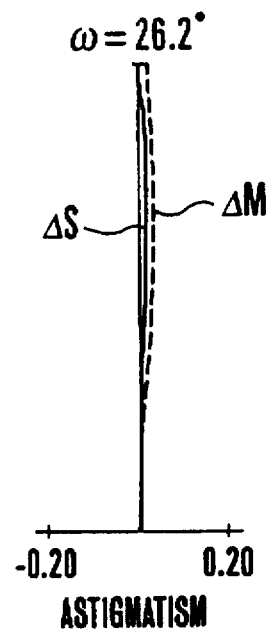
FIG.4(A)(2)
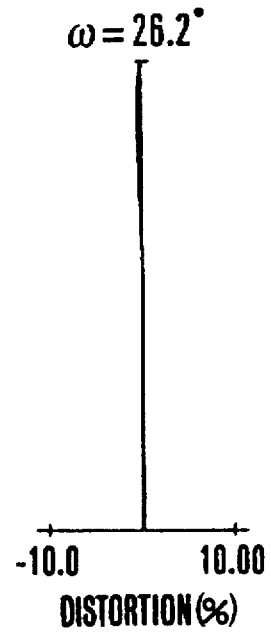
FIG.4(A)(3)
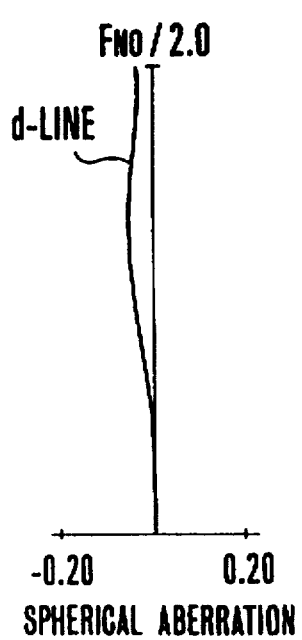
FIG.4(B)(1)
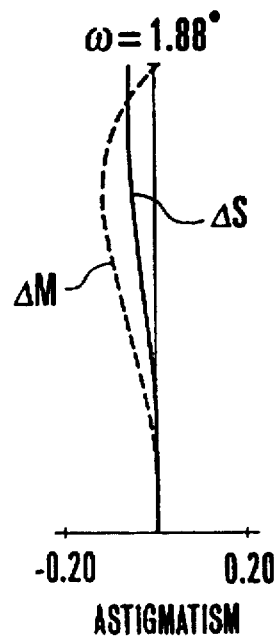
FIG.4(B)(2)
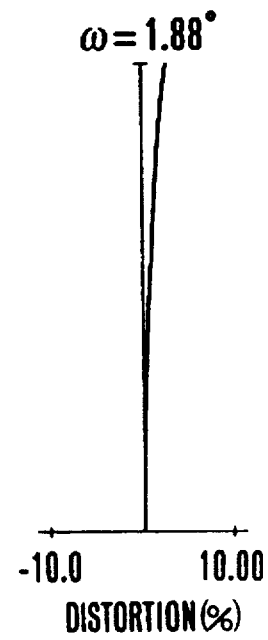
FIG.4(B)(3)

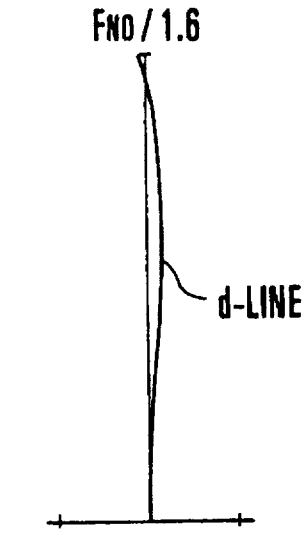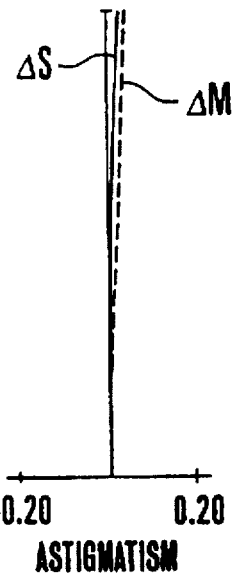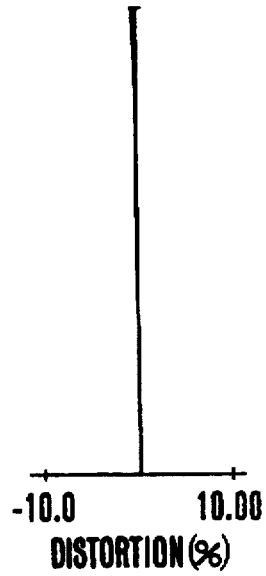
FIG.5(A)(1)    FIG.5(A)(2)    FIG.5(A)(3)
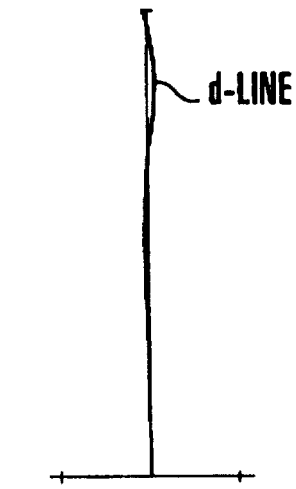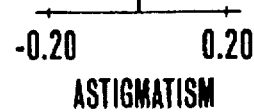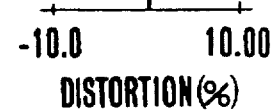
FIG.5(B)(1)    FIG.5(B)(2)    FIG.5(B)(3)

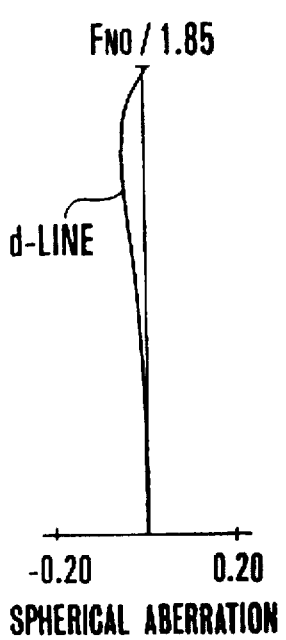
FIG.7(A)(1)
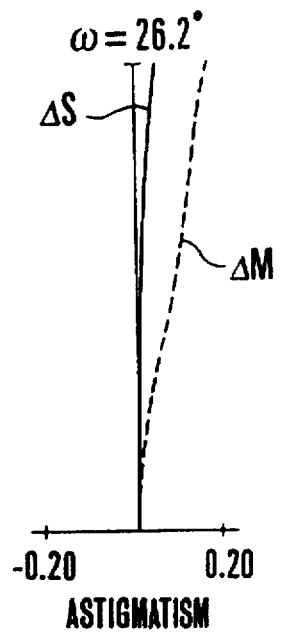
FIG.7(A)(2)
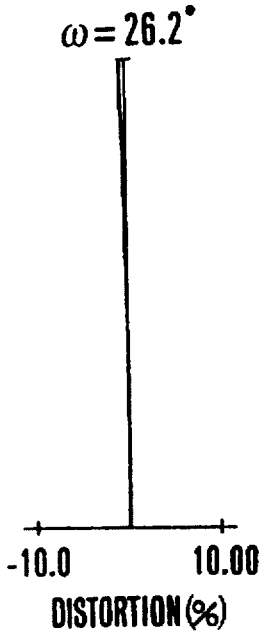
FIG.7(A)(3)
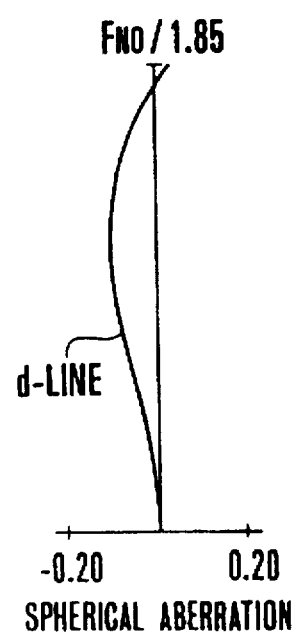
FIG.7(B)(1)
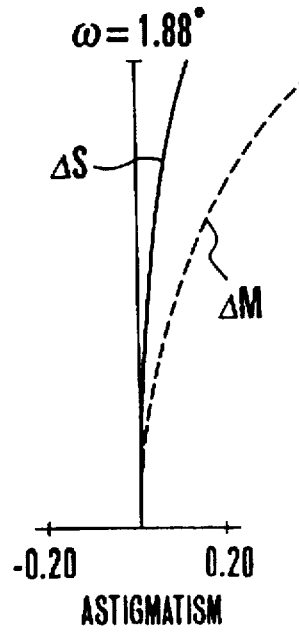
FIG.7(B)(2)
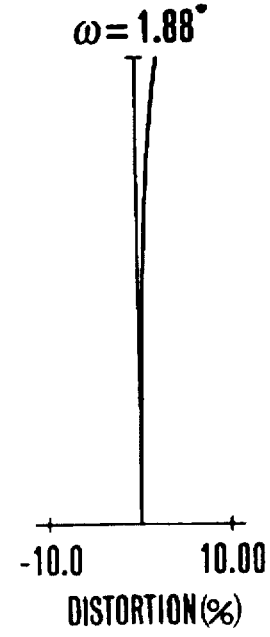
FIG.7(B)(3)

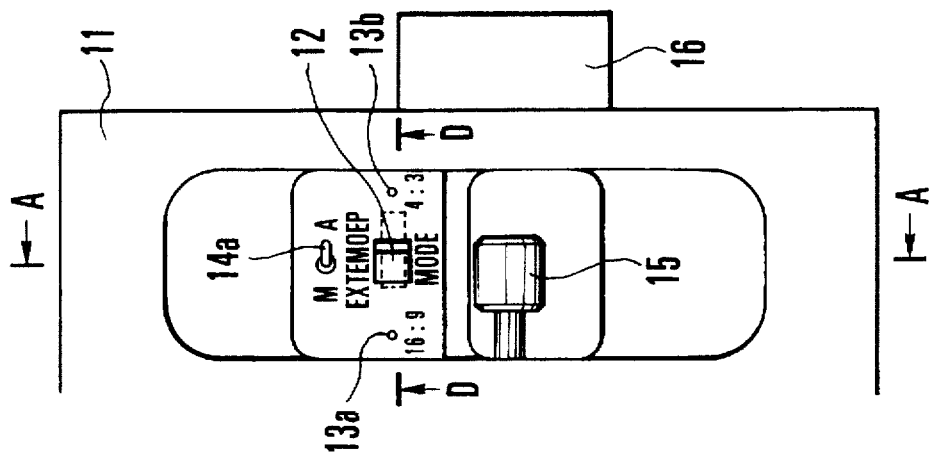
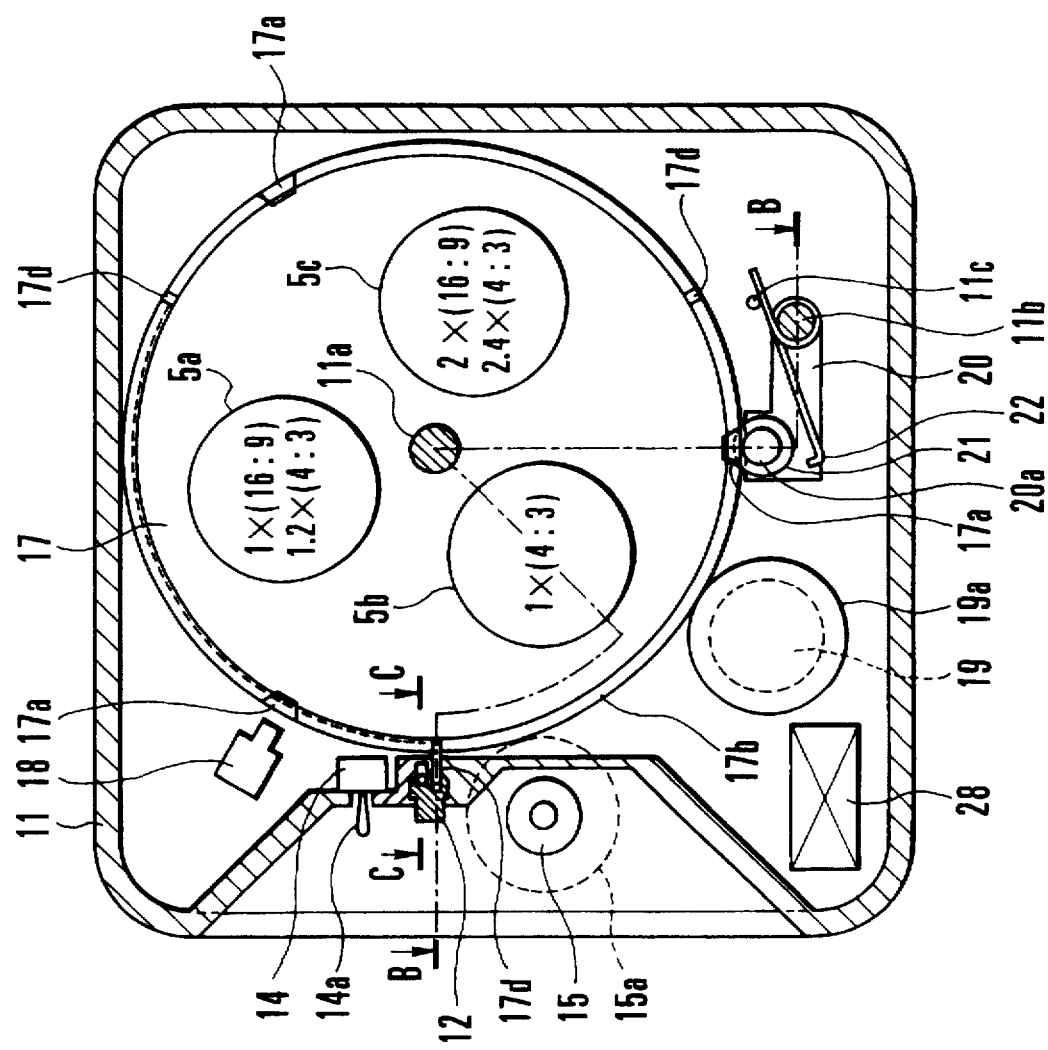

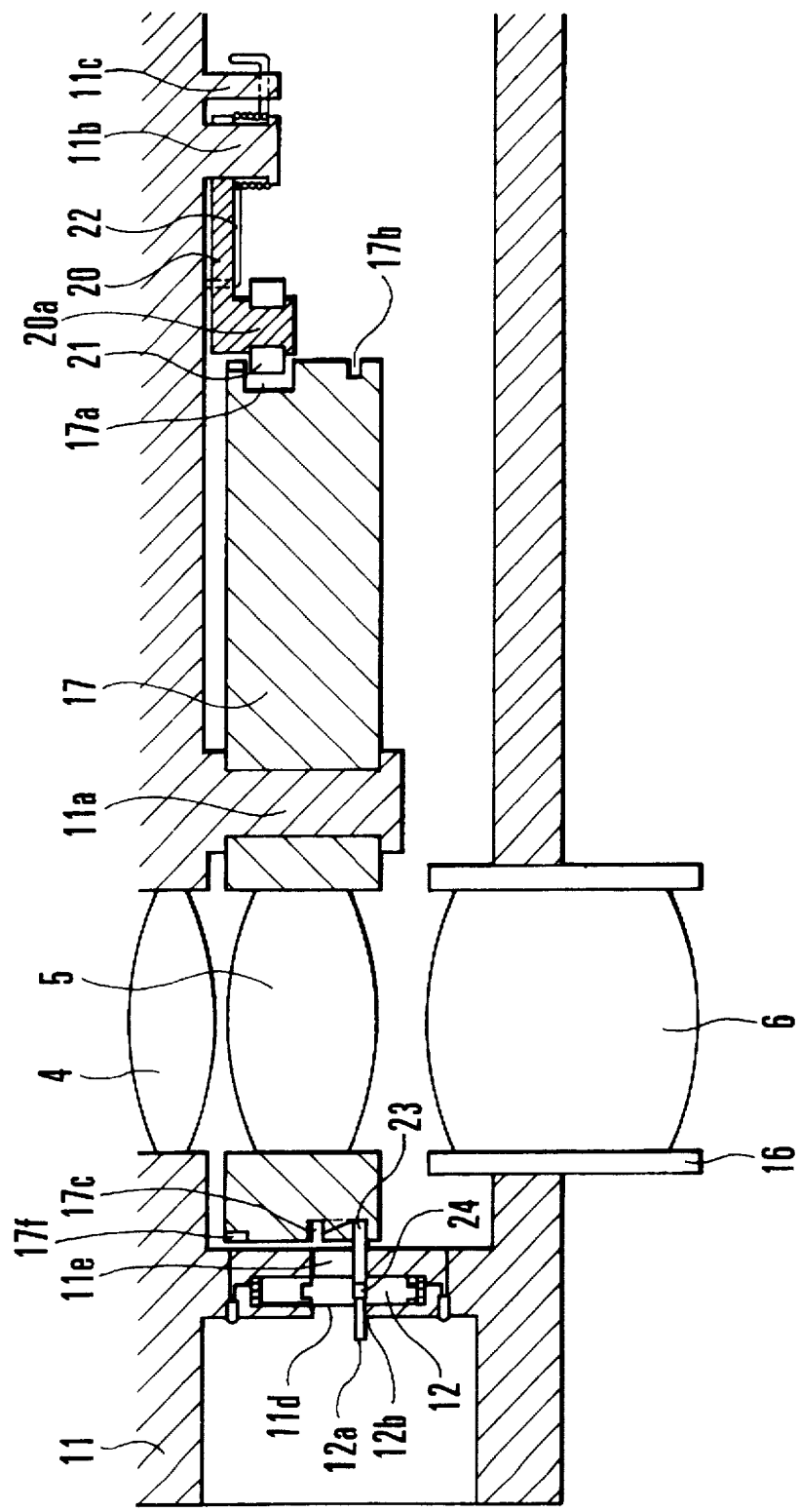

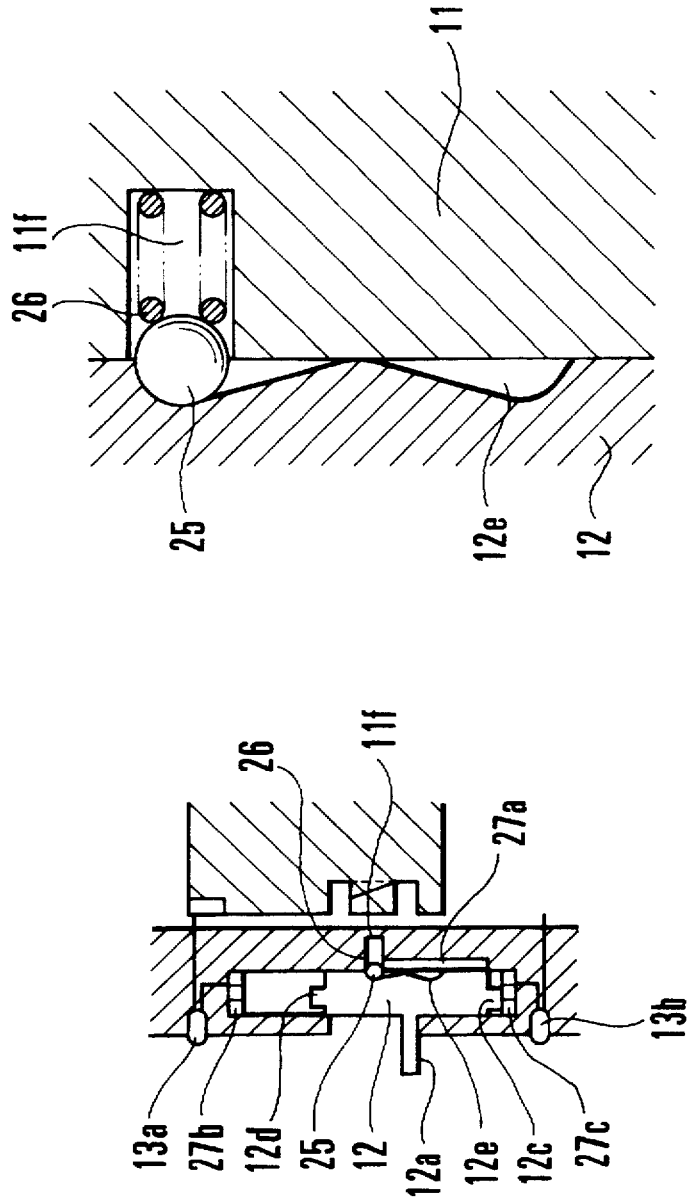

4:3 MODE

16:9 MODE

ZOOM LENS

This application is a continuation of application Ser. No. 08/189,170 filed Jan. 31, 1994, now abandoned.

BACKGROUND OF THE INVENTION

1. Field of the Invention

This invention relates to a zoom lens adapted for a television (TV) camera which is arranged to permit change-over of the aspect ratio of an effective image pickup plane from 16:9 to 4:3 and vice versa.

2. Description of the Related Art

The conventional ordinary TV camera has been arranged to have its effective image pickup plane in the aspect ratio of 4:3. However, an enhanced definition TV (EDTV) system which is arranged to have the image pickup plane in the ratio of 16:9 as a broadcast system for the next generation is now being practicalized. In view of this, it is desirable to have a TV camera arranged for the different broadcast systems to be capable of switching the aspect ratio between the ratios of 16:9 and 4:3.

In the case of a camera using a camera tube, the aspect ratio is easily variable by electrical change-over of the deflection area of an electron beam from one area over to another while keeping the diagonal length of the image plane unchanged. In the case of a solid-state image sensor such as a CCD, however, the electrical change-over must be effected in the following manner according to the intrinsic aspect ratio of the image pickup plane:

In the first case where a camera is of the kind using a CCD element (image sensor) which has an intrinsic image pickup plane of the aspect ratio of 16:9, the whole image plane area of the aspect ratio 16:9 is of course used. When in use for shooting an image plane of the aspect ratio 4:3, which is a part of the image sensor of this size, only a central area in the ratio of 4:3 of the image pickup plane is used without using the right and left parts of the image pickup plane, as shown in FIG. 2(A).

In the second case where the intrinsic image pickup plane of the image sensor of the camera is in the ratio of 4:3, in using an image plane in the aspect ratio of 16:9 for shooting, only a central area in the ratio of 16:9 of the image pickup plane is used without using the upper and lower parts of the image pickup plane, as shown in FIG. 2(B).

In either of the two cases, the diagonal length of the image plane becomes short when the image pickup plane of the image sensor is used in part as mentioned above. Therefore, the above-stated arrangement makes it impossible to fully utilize an image picked up through the lens, narrows the diagonal angle of view and lowers the sensitivity of the image sensor.

SUMMARY OF THE INVENTION

This invention is directed to the solution of the above-stated problems. It is, therefore, a first object of this invention to provide a zoom lens which is to be used for a TV camera arranged to permit change-over of the aspect ratio of an effective image pickup plane and which is arranged to have its image circle variable according to the change-over of the aspect ratio, so that the diagonal angle of view can be prevented from varying.

An embodiment of this invention is arranged to have a conversion lens unit inserted when the shooting mode of the camera is converted from one aspect ratio mode in which the image circle is large to another aspect ratio mode in which the image circle is small. However, with the conversion lens unit inserted, if shooting is carried out in the aspect ratio mode of the large image circle, the peripheral part of an image plane would be eclipsed in an undesirable manner. Therefore, it is a second object of this invention to provide a device which is arranged to prevent the undesirable eclipse.

To attain the first object of this invention, a zoom lens adapted for a camera of the kind arranged to permit change-over of the aspect ratio of its effective image pickup plane is provided with a conversion lens unit which is convertible or detachably attachable. The zoom lens is thus arranged to select the conversion lens unit for the purpose of coping with effective image pickup planes of different aspect ratios while keeping its image forming position unchanged.

To attain the second object of this invention, a shooting apparatus which is capable of changing one aspect ratio of an image pickup plane over to another aspect ratio is provided with an optical unit for preventing an angle of view from being varied by the change-over of the aspect ratio. The apparatus inhibits the use of the optical unit when it is in a shooting mode in which its image circle is in a large aspect ratio.

These and other objects and features of this invention will become apparent from the following detailed description of embodiments thereof taken in connection with the accompanying drawings.

BRIEF DESCRIPTION OF THE DRAWINGS

FIGS. 4(A) (1), 4(A) (2), and 4(A) (3) and 4(B) (1), 4(B) (2) and 4(B) (3) show various aberrations of the zoom lens shown in FIG. 3(A).

FIGS. 5(A) (1), 5(A) (2), and 5(A) (3) and 5(B) (1), 5(B) (2) and 5(B) (3) show various aberrations of the zoom lens shown in FIG. 3(B).

FIGS. 7(A) (1), 7)A) (2) and 7(A) (3) and 7(B) (1), 7(B) (2) and 7(B) (3) show various aberrations of the zoom lens shown in FIG. 6.

FIGS. 8(A) and 8(B) show a change-over mechanism for conversion lens units arranged in a second embodiment of this invention.

FIGS. 9(A), 9(B) and 9(C) are sectional views showing the change-over mechanism of FIGS. 8(A) and 8(B).

DETAILED DESCRIPTION OF THE PREFERRED EMBODIMENTS

Figure 1:
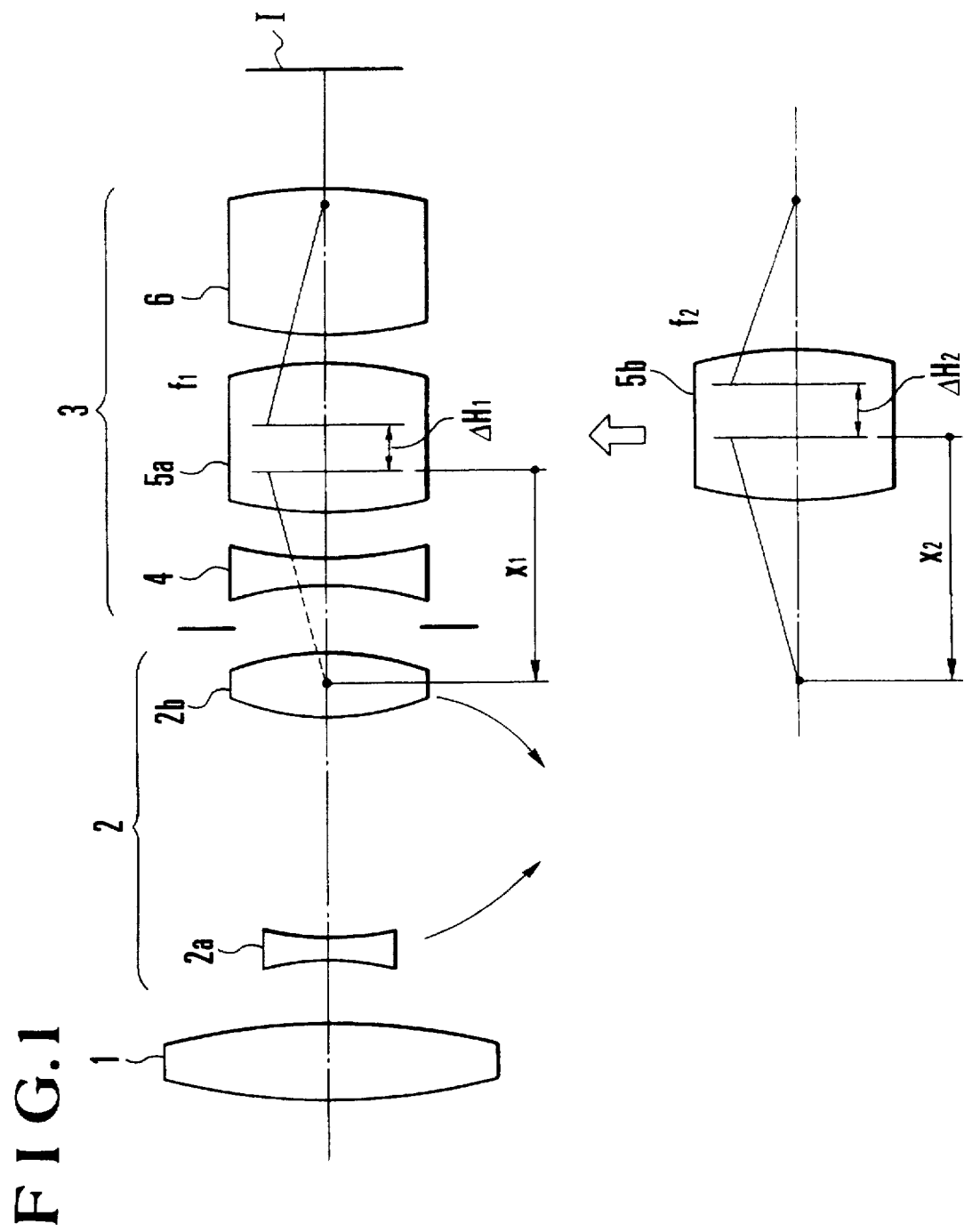
FIG. 1 shows the principle of a zoom lens which is arranged according to this invention.
Figure 2A:
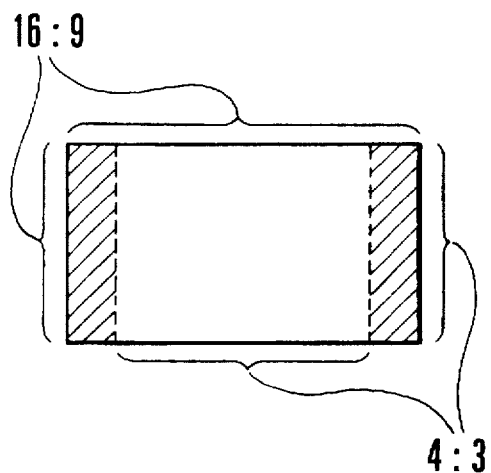
FIGS. 2(A) and 2(B) show the change-over of the image format of an image sensor.
Figure 2B:
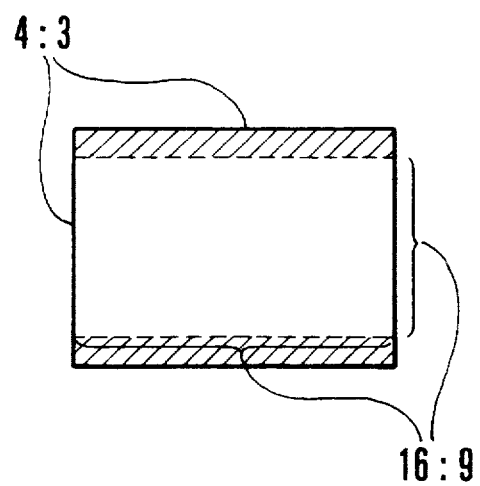

FIG. 1 shows in outline a zoom lens related to this invention. Referring to FIG. 1, a front lens unit 1 is arranged to perform a focusing action. A variator lens unit 2 consists of a lens unit (a variator lens) 2a and a lens unit (a compensator lens) 2b. A relay lens unit 3 consists of a fixed front relay unit 4, a conversion lens unit 5a or 5b and a fixed rear relay unit 6. The conversion lens unit 5a or 5b is supported by a turret and is arranged to be insertable and retractable into or out of the optical path of the zoom lens. A solid-state image sensor I is a CCD (charge coupled device) or the like and is arranged to have an area of an intrinsic aspect ratio of 16:9 and to permit use of an area of an aspect area 4:3 within the intrinsic aspect ratio area.

In the first case where an image sensor of the intrinsic aspect ratio of 16:9 is used, as mentioned in the foregoing, the zoom lens is arranged as follows: With a distance from the front principal point of the conversion lens unit 5a which has a larger image circle to the position of an image formed by the lens units located in front of the conversion lens unit 5a assumed to be x1, a distance between the principal points of the conversion lens unit 5a to be $\Delta H1$, the focal length of the whole conversion lens unit 5a to be f1, a distance from the front principal point of the conversion lens unit 5b which has a smaller image circle to the position of the image formed by the lens units located in front of the lens unit 5b to be x2, a distance between the principal points of the conversion lens unit 5b to be $\Delta H2$, and the focal length of the whole conversion lens unit 5b to be f2, the zoom lens satisfies the following conditions:

$$\Delta H1 - x1^2/(x1+f1) = \Delta H2 - x2^2/(x2+f2) \quad (1)$$

$$1.16 < (1+x2/f2)/(1+x1/f1) < 1.28 \quad (2)$$

In the second case where the intrinsic aspect ratio of the image sensor is 4:3, the zoom lens is arranged as follows: With the symbols defined in the same manner as those defined above for the first case, the zoom lens satisfies the following condition in addition to the condition formula (1) shown above:

$$1.04 < (1+x2/f2)/(1+x1/f1) < 1.14 \quad (3)$$

In attaching or detaching the conversion lens unit 5a or 5b, with the position of the principal points assumed to be an arbitrary point in a void space having nothing, say, in the middle point of the void space, the distance between the principal points $\Delta H$ is arranged to be zero and the focal length to be at infinity.

The condition formula (1) represents a condition necessary for keeping an image forming plane unvarying in changing one conversion lens unit over to the other. The condition formulas (2) and (3) represent conditions for restricting a ratio between the sizes of image circles within a predetermined range when one conversion lens unit is changed over to the other. A central value 1.22 is restricted within a range of plus or minus 5% by the formula (2) while a central value 1.09 is restricted within a range of plus or minus 5% by the formula (3). In both cases, a change in the image circle is too small with the lower limit value of the range exceeded for attaining the advantageous effect of this invention, that is, for keeping the angle of view unchanged. If the upper limit value of the range is exceeded, on the other hand, the image circle becomes too small and would cause an undesirable eclipse in the corners of a picture.

The following describes a zoom lens which is arranged according to this invention as a first embodiment thereof. In this case, the zoom lens is used for a camera using an image sensor of a CCD with its image pickup plane in an intrinsic aspect ratio of 16:9 and the zoom lens is arranged to permit change-over to an area of an aspect ratio of 4:3 which is a part of the intrinsic area.

Figure 3A:
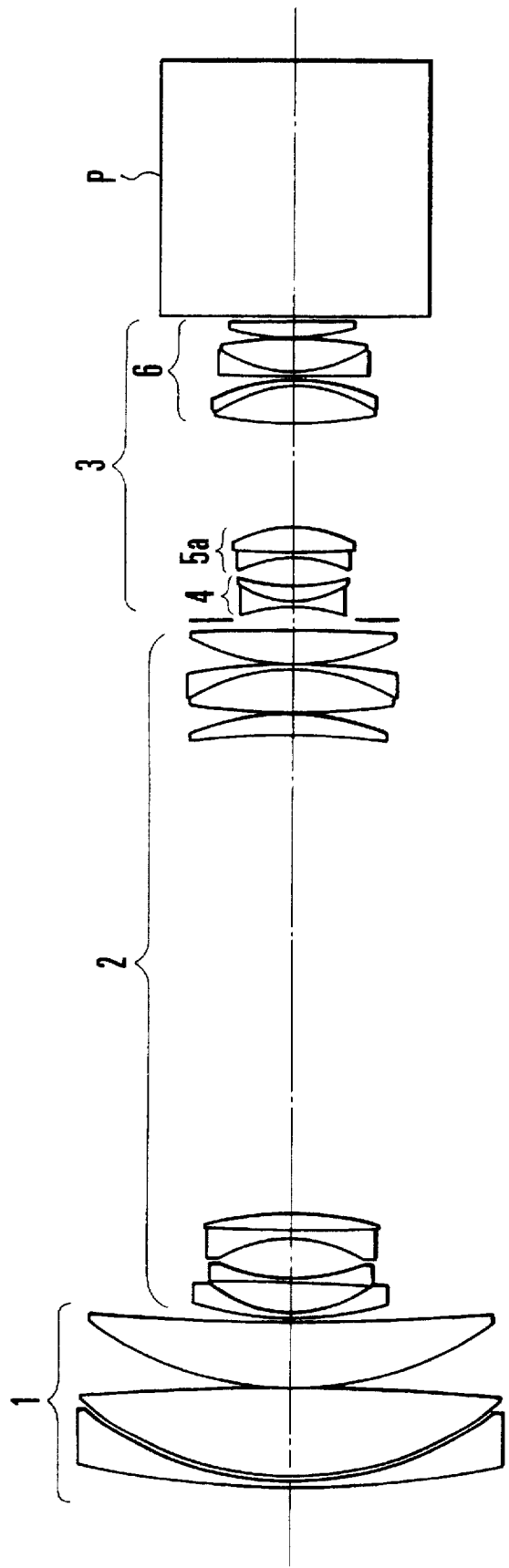
FIGS. 3(A) and 3(B) are sectional views of zoom lenses showing them as the numerical examples 1-1 and 1-2 of a first embodiment of this invention.

The zoom lens which is the first embodiment of this invention is arranged to be used for a camera having its image pickup plane which is intrinsically in an aspect ratio of 16:9 and measures 11 mm in diagonal length. The lens arrangement is represented by a numerical example 1-1 given herein. The conversion lens unit 5a includes a surfaces r25 to r27. The F-number of the zoom lens is F2. The angle of view is 52.4 degrees at a wide-angle end position of the zoom lens and 3.76 degrees at a telephoto end position. FIG. 3(A) shows a sectional view of the zoom lens. FIGS. 4(A) (1), 4(A) (2), 4(A) (3), 4(B) (1), 4(B) (2), and 4(B) (3) respectively show aberrations obtained at the wide-angle end and telephoto end positions of the zoom lens.

Figure 3B:
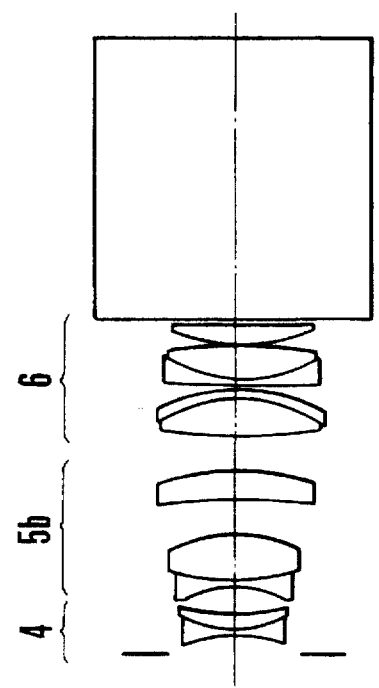

When the aspect ratio of the camera is changed from the above-stated ratio of 16:9 over to the aspect ratio of 4:3, the conversion lens unit 5a is replaced with the other conversion lens unit 5b, which is as represented by a numerical example 1-2. With the conversion lens unit thus replaced, the focal length is multiplied by 0.824 and the diagonal length of image becomes 9 mm to keep the angle of view unchanged. The F-number changes to F1.6 in proportion to the image diagonal length, so that the sensitivity of a camera system including the camera can be retained. FIG. 3(B) shows in a sectional view the state of the zoom lens thus obtained (showing only the relay lens part). The aberrations thus obtained at the wide-angle end and telephoto end positions are shown in FIGS. 5(A) (1), 5(A) (2), 5(A) (3), 5(B) (1), 5(B) (2), and 5(B) (3), respectively.

It is apparent from these drawings that the zoom lens which is arranged as the first embodiment of this invention satisfies the condition formulas (1) and (2) to give the advantages of this invention.

In the case of a numerical example 2 where the camera uses an image sensor of the aspect ratio of 4:3 and the aspect ratio is arranged to be changed over to the aspect ratio of 16:9, the lens is arranged to give the diagonal length of 11 mm when the image pickup plane is in the aspect ratio of 4:3 in the same manner as the numerical example 1-1 mentioned above.

Figure 6:
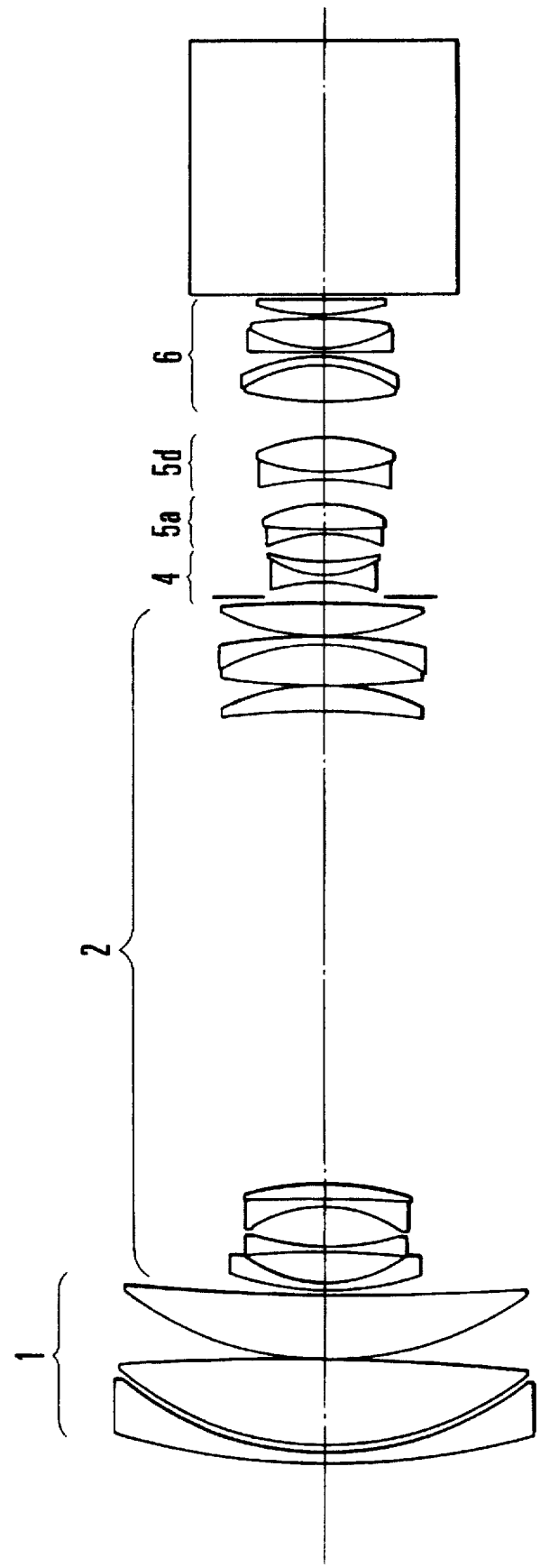
FIG. 6 is a sectional view of a zoom lens showing the zoom lens as a numerical example 2 of the first embodiment of this invention.

In the case of the numerical example 2, when the aspect ratio of the camera is changed over to the aspect ratio of 16:9, the image circle is changed by inserting an optical system 5d into an air space provided between the conversion lens unit 5a and the rear relay lens unit 6 as shown in FIG. 3(A). By this method, the focal length is multiplied by 0.918 and the image diagonal length is changed to 10.1 mm to keep the angle of view unchanged. The F-number becomes F1.85. FIG. 6 shows in a sectional view the state of the lens obtained in this manner. The aberrations obtained then at the wide-angle end and telephoto end positions are shown respectively in FIGS. 7(A) (1), 7(A) (2), 7(A) (3), 7(B) (1), 7(B) (2), and 7(B) (3).

Numerical Example 1-1 f = 11.18  Fno. = 1:2.0  2ω = 52.4°

|   |   |   |   |   |
|---|---|---|---|---|
| 1 | r1 = 201.367 | d1 = 3.09 | n1 = 1.68893 | ν1 = 31.1 |
| " | r2 = 79.603 | d2 = 1.65 | | |
| " | r3 = 81.681 | d3 = 18.99 | n2 = 1.48749 | ν2 = 70.2 |
| " | r4 = −434.228 | d4 = 0.21 | | |
| " | r5 = 79.677 | d5 = 14.09 | n3 = 1.51633 | ν3 = 64.2 |
| " | r6 = 581.253 | d6 = Variable | | |
| 2 | r7 = 70.957 | d7 = 1.65 | n4 = 1.77250 | ν4 = 49.6 |
| " | r8 = 29.208 | d8 = 6.76 | | |
| " | r9 = −2104.508 | d9 = 1.51 | n5 = 1.77250 | ν5 = 49.6 |
| " | r10 = 59.821 | d10 = 8.57 | | |
| " | r11 = −32.423 | d11 = 1.51 | n6 = 1.77250 | ν6 = 49.6 |
| " | r12 = 345.764 | d12 = 4.32 | n7 = 1.92286 | ν7 = 21.3 |
| " | r13 = −65.282 | d13 = Variable | | |
| " | r14 = −535.129 | d14 = 6.13 | n8 = 1.48749 | ν8 = 70.2 |
| " | r15 = −50.925 | d15 = 0.21 | | |
| " | r16 = 263.617 | d16 = 8.55 | n9 = 1.64000 | ν9 = 60.1 |
| " | r17 = −47.422 | d17 = 1.65 | n10 = 1.80518 | ν10 = 25.4 |
| " | r18 = −147.421 | d18 = 0.21 | | |
| " | r19 = 53.825 | d19 = 7.03 | n11 = 1.48749 | ν11 = 70.2 |
| " | r20 = −646.250 | d20 = Variable | | |
| " | r21 = (Stop) | d21 = 4.10 | | |
| 4 | r22 = −34.543 | d22 = 0.96 | n12 = 1.65160 | ν12 = 58.5 |
| " | r23 = 23.000 | d23 = 3.35 | n13 = 1.69895 | ν13 = 30.1 |
| " | r24 = 49.325 | d24 = 6.58 | | |
| 5a | r25 = −29.978 | d25 = 1.03 | n14 = 1.64000 | ν14 = 60.1 |
| " | r26 = 270.000 | d26 = 6.00 | n15 = 1.68893 | ν15 = 31.1 |
| " | r27 = −27.453 | d27 = 23.38 | | |
| 6 | r28 = 101.358 | d28 = 8.48 | n16 = 1.48749 | ν16 = 70.2 |
| " | r29 = −28.606 | d29 = 1.51 | n17 = 1.75520 | ν17 = 27.5 |
| " | r30 = −38.074 | d30 = 0.14 | | |
| " | r31 = 175.762 | d31 = 1.31 | n18 = 1.75520 | ν18 = 27.5 |
| " | r32 = 27.129 | d32 = 6.72 | n19 = 1.51112 | ν19 = 60.5 |
| " | r33 = −276.568 | d33 = 0.76 | | |
| " | r34 = 44.000 | d34 = 3.99 | n20 = 1.49782 | ν20 = 66.8 |
| | r35 = ∞ | d35 = 1.00 | | |
| | r36 = ∞ | d36 = 60.00 | n21 = 1.51633 | ν21 = 64.2 |
| | r37 = ∞ | | | |

| | Focal length | |
|---|---|---|
| Variable Separation | 11.18 | 161.75 |
| d6 | 1.68 | 71.22 |
| d13 | 110.05 | 2.07 |
| d20 | 2.05 | 40.49 |

Focal length of the conversion lens unit f=162.52 Distance between principal points of the conversion lens unit ΔH=4.36

Distance from the front principal point of the conversion lens unit to an image formed by the lens units located in front of the conversion lens unit x=−118.79

$$\Delta H - \frac{X^2}{X+f} = -318.3$$

$$1 + \frac{X}{f} = 0.269$$

Numerical Example 1-2 f = 9.21  Fno. 1:1.6  2ω = 52.4°

| | | | |
|---|---|---|---|
| r1 = 201.367 | d1 = 3.09 | n1 = 1.68893 | ν1 = 31.1 |
| r2 = 79.603 | d2 = 1.65 | | |
| r3 = 81.681 | d3 = 18.99 | n2 = 1.48749 | ν2 = 70.2 |
| r4 = −434.228 | d4 = 0.21 | | |
| r5 = 79.677 | d5 = 14.09 | n3 = 1.51633 | ν3 = 64.2 |
| r6 = 581.253 | d6 = Variable | | |
| r7 = 70.957 | d7 = 1.65 | n4 = 1.77250 | ν4 = 49.6 |
| r8 = 29.208 | d8 = 6.76 | | |
| r9 = −2104.508 | d9 = 1.51 | n5 = 1.77250 | ν5 = 49.6 |
| r10 = 59.821 | d10 = 8.57 | | |
| r11 = −32.423 | d11 = 1.51 | n6 = 1.77250 | ν6 = 49.6 |
| r12 = 345.764 | d12 = 4.32 | n7 = 1.92286 | ν7 = 21.3 |
| r13 = −65.282 | d13 = Variable | | |
| r14 = −535.129 | d14 = 6.13 | n8 = 1.48749 | ν8 = 70.2 |
| r15 = −50.925 | d15 = 0.21 | | |
| r16 = 263.617 | d16 = 8.55 | n9 = 1.64000 | ν9 = 60.1 |
| r17 = −47.422 | d17 = 1.65 | n10 = 1.80518 | ν10 = 25.4 |
| r18 = −147.421 | d18 = 0.21 | | |
| r19 = 53.825 | d19 = 7.03 | n11 = 1.48749 | ν11 = 70.2 |
| r20 = −646.250 | d20 = Variable | | |
| r21 = (Stop) | d21 = 4.10 | | |
| r22 = −34.543 | d22 = 0.96 | n12 = 1.65160 | ν12 = 58.5 |
| r23 = 23.000 | d23 = 3.35 | n13 = 1.69895 | ν13 = 30.1 |
| r24 = 49.325 | d24 = 5.07 | | |
| 5b r25 = −26.288 | d25 = 1.40 | n14 = 1.80400 | ν14 = 46.6 |
| " r26 = 36.503 | d26 = 9.86 | n15 = 1.72825 | ν15 = 28.5 |
| " r27 = −32.332 | d27 = 6.40 | | |
| " r28 = −161.963 | d28 = 6.56 | n16 = 1.62041 | ν16 = 60.3 |
| " r29 = −56.088 | d29 = 7.70 | | |
| r30 = 101.358 | d30 = 8.48 | n17 = 1.48749 | ν17 = 70.2 |
| r31 = −28.606 | d31 = 1.51 | n18 = 1.75520 | ν18 = 27.5 |
| r32 = −38.074 | d32 = 0.14 | | |
| r33 = 175.762 | d33 = 1.31 | n19 = 1.75520 | ν19 = 27.5 |
| r34 = 27.129 | d34 = 6.72 | n20 = 1.51112 | ν20 = 60.5 |
| r35 = −276.568 | d35 = 0.76 | | |
| r36 = 44.000 | d36 = 3.99 | n21 = 1.49782 | ν21 = 66.8 |
| r37 = ∞ | d37 = 1.00 | | |
| r38 = ∞ | d38 = 60.00 | n22 = 1.51633 | ν22 = 64.2 |
| r39 = ∞ | | | |

| | Focal length | |
|---|---|---|
| Variable Separation | 9.22 | 138.26 |
| d6 | 1.68 | 71.22 |
| d13 | 110.05 | 2.07 |
| d20 | 2.05 | 40.49 |

Focal length of the conversion lens unit f=249.18 Distance between principal points of the conversion lens unit ΔH=27.99

Distance from the front principal point of the conversion lens unit to an image formed by the lens units located in front of the conversion lens unit x=−167.85

$$\Delta H - \frac{X^2}{X+f} = -318.3$$

$$1 + \frac{X}{f} = 0.326$$

Numerical Example 2 f = 10.29  Fno. = 1:85  2ω = 52.4°

| | | | |
|---|---|---|---|
| r1 = 201.367 | d1 = 3.09 | n1 = 1.68893 | ν1 = 31.1 |
| r2 = 79.603 | d2 = 1.65 | | |
| r3 = 81.681 | d3 = 18.99 | n2 = 1.48749 | ν2 = 70.2 |
| r4 = −434.228 | d4 = 0.21 | | |
| r5 = 79.677 | d5 = 14.09 | n3 = 1.51633 | ν3 = 64.2 |
| r6 = 581.253 | d6 = Variable | | |

-continued

Numerical Example 2

| | | | |
|---|---|---|---|
| r7 = 70.957 | d7 = 1.65 | n4 = 1.77250 | v4 = 49.6 |
| r8 = 29.208 | d8 = 6.76 | | |
| r9 = −2104.508 | d9 = 1.51 | n5 = 1.77250 | v5 = 49.6 |
| r10 = 59.821 | d10 = 8.57 | | |
| r11 = −32.423 | d11 = 1.51 | n6 = 1.77250 | v6 = 49.6 |
| r12 = 345.764 | d12 = 4.32 | n7 = 1.92286 | v7 = 21.3 |
| r13 = −65.282 | d13 = Variable | | |
| r14 = −535.129 | d14 = 6.13 | n8 = 1.48749 | v8 = 70.2 |
| r15 = −50.925 | d15 = 0.21 | | |
| r16 = 263.617 | d16 = 8.55 | n9 = 1.64000 | v9 = 60.1 |
| r17 = −47.422 | d17 = 1.65 | n10 = 1.80518 | v10 = 25.4 |
| r18 = −147.421 | d18 = 0.21 | | |
| r19 = 53.825 | d19 = 7.03 | n11 = 1.48749 | v11 = 70.2 |
| r20 = −646.250 | d20 = Variable | | |
| r21 = (Stop) | d21 = 4.10 | | |
| r22 = −34.543 | d22 = 0.96 | n12 = 1.65160 | v12 = 58.5 |
| r23 = 23.000 | d23 = 3.35 | n13 = 1.69895 | v13 = 30.1 |
| r24 = 49.325 | d24 = 6.58 | | |
| 5a r25 = −29.978 | d25 = 1.03 | n14 = 1.64000 | v14 = 60.1 |
| " r26 = 270.000 | d26 = 6.00 | n15 = 1.68893 | v15 = 31.1 |
| " r27 = −27.453 | d27 = 5.80 | | |
| 5d r28 = −52.466 | d28 = 1.40 | n16 = 1.83481 | v16 = 42.7 |
| " r29 = 52.466 | d29 = 7.44 | n17 = 1.67270 | v17 = 32.1 |
| " r30 = −39.577 | d30 = 8.74 | | |
| r31 = 101.358 | d31 = 8.48 | n18 = 1.48749 | v18 = 70.2 |
| r32 = −28.606 | d32 = 1.51 | n19 = 1.75520 | v19 = 27.5 |
| r33 = −38.074 | d33 = 0.14 | | |
| r34 = 175.762 | d34 = 1.31 | n20 = 1.75520 | v20 = 27.5 |
| r35 = 27.129 | d35 = 6.72 | n21 = 1.51112 | v21 = 60.5 |
| r36 = −276.568 | d36 = 0.76 | | |
| r37 = 44.000 | d37 = 3.99 | n22 = 1.49782 | v22 = 66.8 |
| r38 = ∞ | d38 = 1.00 | | |
| r39 = ∞ | d39 = 60.00 | n23 = 1.51633 | v23 = 64.2 |
| r40 = ∞ | | | |

| | Focal length | |
|---|---|---|
| Variable Separation | 10.29 | 154.35 |
| d6 | 1.68 | 71.22 |
| d13 | 110.05 | 2.07 |
| d20 | 2.05 | 40.49 |

A mechanism for change-over of the conversion lens units and an electrical circuit system for the change-over mechanism are described below as a second embodiment of this invention. The second embodiment is characterized in the following points:

(a) A mode change-over switch is provided on the side of a lens body for selection of either a mode of using the aspect ratio of 16:9 or a mode of using the aspect ratio of 4:3. An aspect ratio currently selected is displayed in response to a selecting operation on the mode change-over switch. Hereinafter, these aspect ratio selection modes will be referred to respectively as the 16:9 mode and the 4:3 mode.

(b) Three kinds of conversion lens units are mounted on a turret disposed within the zoom lens, including (1) a conversion lens unit 5a which is to be used for 1 magnification in the 16:9 mode and for 1.2 magnifications in the 4:3 mode, (2) a conversion lens unit 5c which is to be used for 2 magnifications in the 16:9 mode and for 2.4 magnifications in the 4:3 mode, and (3) a conversion lens unit 5b which is to be used solely for 1 magnification in the 4:3 mode. In the 16:9 mode, the selection of the optical system which is provided solely for 1 magnification in the 4:3 mode is inhibited.

Figure 10A:
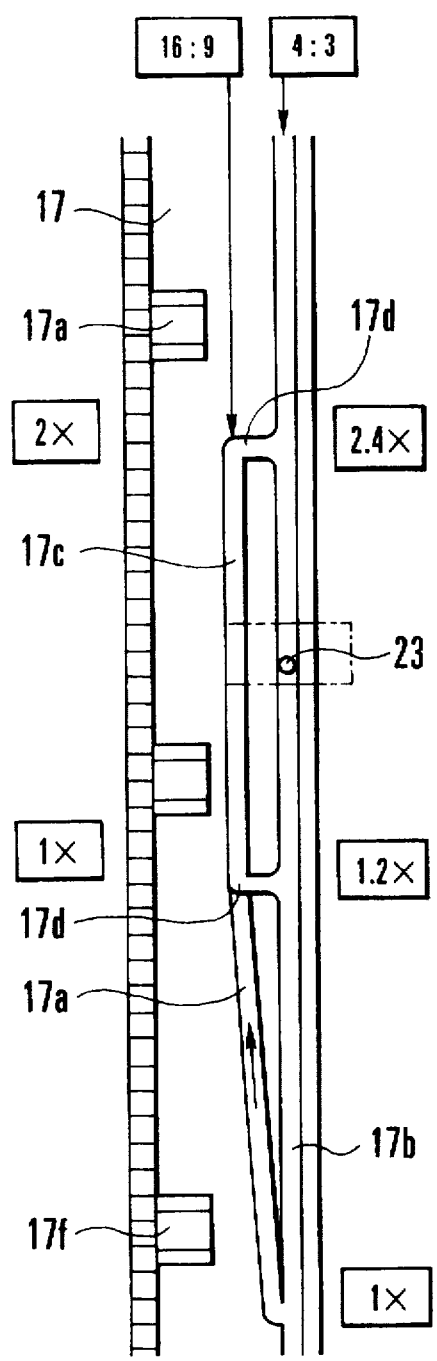
FIGS. 10(A) and 10(B) are side views showing parts around a turret shown in FIGS. 8(A) and 8(B).
Figure 10B:
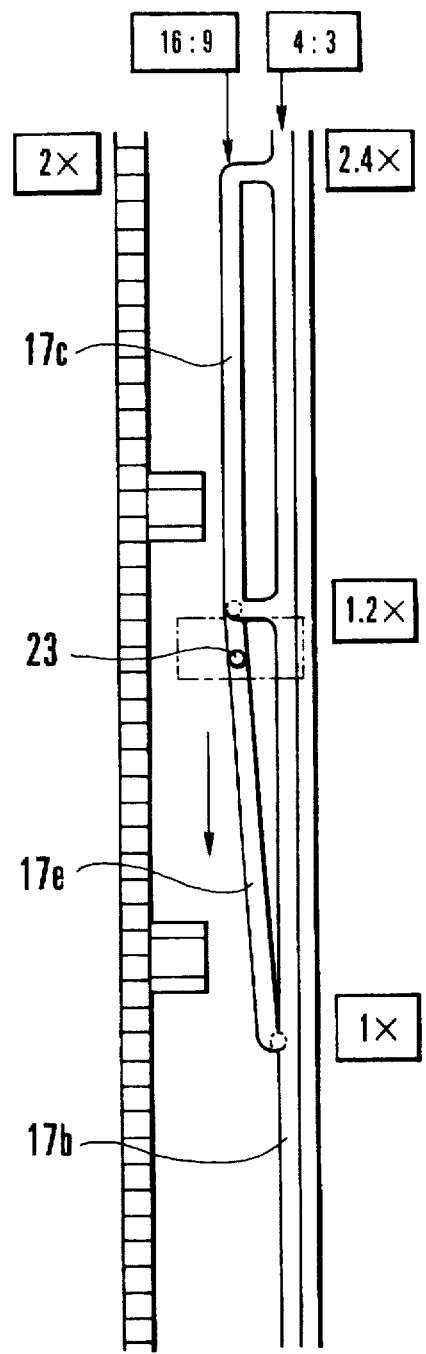
Figure 11A:
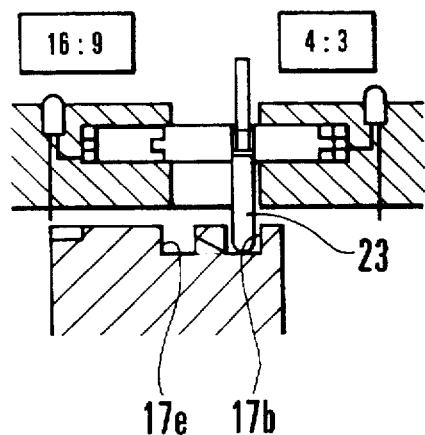
FIGS. 11(A) and 11(B) are sectional views showing an operation part shown in FIGS. 8(A) and 8(B).
Figure 11B:
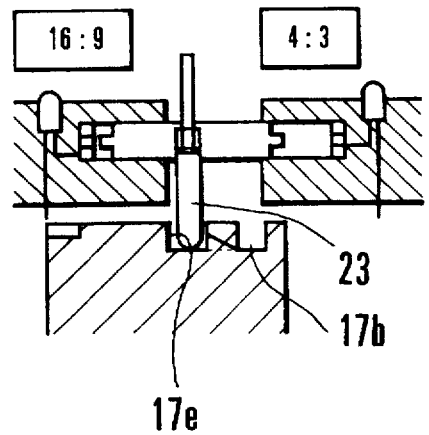
Figure 12:
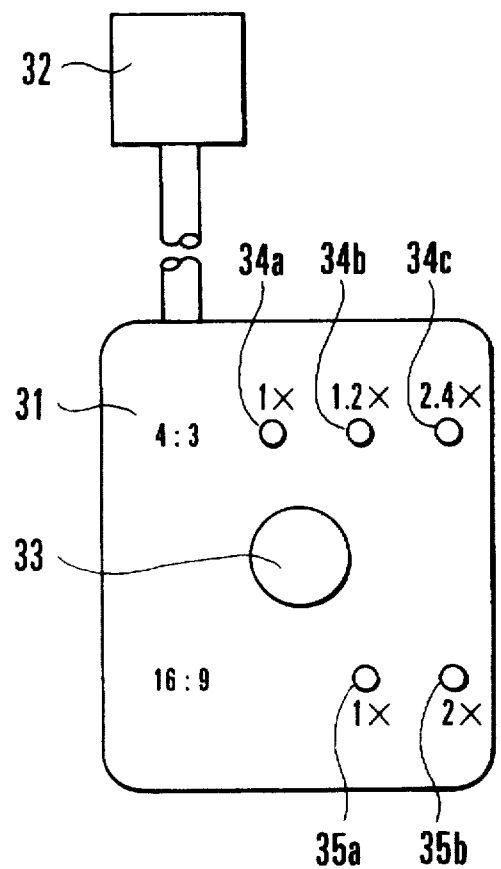
FIG. 12 shows a remote control box of the change-over mechanism provided for conversion lens units arranged in the second embodiment of this invention.
Figure 13:
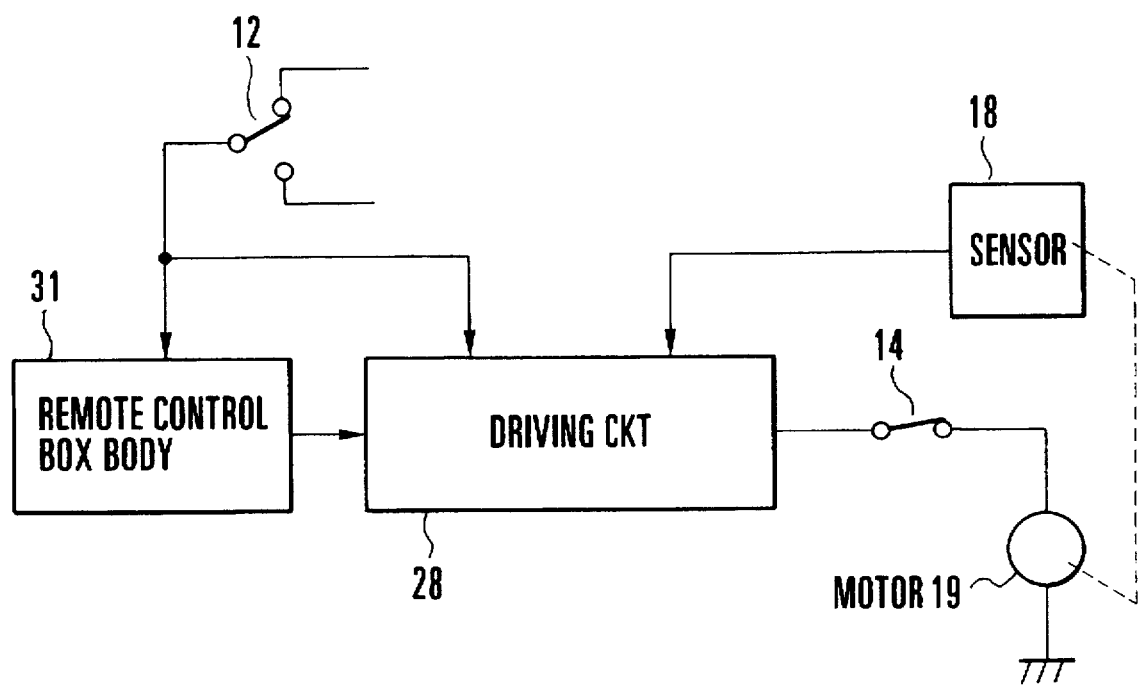
FIG. 13 is a block diagram showing a control box arranged in the second embodiment of this invention.

The use of the exclusive purpose conversion lens unit 5b corresponds to an attempt to attain a wider angle in the 16:9 shooting mode. However, the reason for inhibiting the selection of this conversion lens unit 5b in the 16:9 mode lies in that the use of it brings about an eclipse in the case of the wide image circle. FIGS. 8(A) and 8(B) to FIG. 13 show the second embodiment. FIG. 8(B) is a side view of the second embodiment, and FIG. 8(A) is a sectional view taken along a line A—A of FIG. 8(B) and shows a side section of the turret part. FIG. 9(A) is a sectional view taken along a line B—B of FIG. 8(A). FIG. 9(B) is a sectional view taken along a line C—C of the FIG. 8(A). FIG. 9(C) is an enlarged view showing a part of FIG. 9(A). FIGS. 11(A) and 11(B) are sectional views taken along a line D—D of FIG. 8(B). FIGS. 10(A) and 10(B) are side development views showing parts around the turret part. FIG. 12 shows the appearance of a remote control box which is provided for selection of one of the conversion lens units by means of a motor. FIG. 13 is a block diagram showing the electrical system of the second embodiment.

As shown in FIG. 8(B), operation parts and display functions are concentratedly arranged on one side of a lens body 11. Referring to FIG. 8(B), a slide switch 12 is provided for selection of the 16:9 or 4:3 mode. Display lamps 13a and 13b are arranged to display the mode selected by the slide switch 12. A toggle switch lever 14a is provided for change-over between a manual selection "M" and an electrical selection "A" of the conversion lens unit. A knob 15 is provided for the manual selection of the conversion lens unit.

Referring to FIGS. 8(A), 8(B) and 9(A) to 9(C), a toggle switch 14 is provided for selection and change-over from one to another the conversion lens units 5a, 5b and 5c which are spaced at equal angular intervals on one and the same circumference by piercing a turret 17 which is arranged to rotate on a fixed shaft 11a. When the manual selection "M" is selected by the toggle switch 14, one of the three different conversion lens units 5a, 5b and 5c is selected by turning the manual operation knob 15 connected to a knob gear 15a which engages a turret gear 17f of the turret 17.

In the case of the electrical selection "A", a position instruction signal for the conversion lens unit selected by the control box and a position signal from a sensor 18 arranged within the lens to detect the position of the conversion lens unit are inputted to a conversion lens unit driving circuit 28. When the instruction signal and the position signal do not coincide with each other, a voltage is applied from the conversion lens unit driving circuit 28 to a turret driving motor 19 to cause a motor gear 19a connected to the turret driving motor 19 to rotate the turret gear 17f until they come to coincide.

The turret 17 is simply kept in position for the selected conversion lens unit in the following manner: A rotary body 21 is arranged to rotate on a fixed shaft 20a provided on a lever 20 which is arranged to swing on a fixed shaft 11b. To keep the turret 17 in position, this rotary body 21 is caused by the resilient pressure of a torsion coil spring 22 to fall into one of three V-shaped grooves 17a provided in the circumferential side face of the turret 17 at equal angle intervals. When a torque exceeding a predetermined value is applied to the turret 17 either by the manual operation knob 15 or by the turret driving motor 19, the rotary body 21 pulls out of the groove 17a to allow the turret 17 to rotate. A fixed pin 11c is arranged to hold one end of the torsion coil spring 22. In FIGS. 6, 8(A) and 8(B), the embodiment is shown as in a state of having selected the lens of 1 magnification in the 4:3 mode.

The 16:9/4:3 mode selection (or change-over) is made by sliding the lever 12a of the slide switch 12 which pierces through a hole 11d provided in the lens body 11. The positions of the conversion lens units are restricted by a restriction pin 23. The restriction pin 23 engages a hole 12b which is provided in the slide switch 12 and pierces through the hole 11e of the lens body 11 and restriction grooves 17b, 17c, 17d and 17e which are consecutively formed in the outer circumferential side face of the turret 17. The restriction pin 23 is pressed against these grooves 17b to 17e by a compression coil spring 24. As shown in FIGS. 11(A) and 10(B), the groove 17b is provided along the whole circumference of the turret 17 for the 4:3 mode. The groove 17c is provided only on a part of the circumference corresponding to an area between 1 and 2 magnifications for the 16:9 mode. The two grooves 17b and 17c are interconnected at 1- and 2-magnification positions of the 16:9 mode by the groove 17d which is perpendicular to these long grooves 17b and 17c. The turret 17 is thus arranged to be rotatable only within the grooves 17b and 17c.

The 1-magnification position of the 4:3 mode and that of the 16:9 mode are interconnected also by the groove 17e which is obliquely formed to have a groove bottom become shallower in the direction of arrow shown in FIG. 8(A). In changing the embodiment from the state of 1 magnification in the 4:3 mode over to the 16:9 mode, the pin 23 moves from the groove 17b into the groove 17e, as shown in FIGS. 11(B) and 8(B), and presses the side wall of the groove 17e while contracting the compression coil spring 24. A component of the pressure causes the turret 17 to rotate in the direction of arrow shown in FIG. 10(A). The turret 17 eventually reaches the 1-magnification point of the 16:9 mode where the pin 23 is caused to fall into the groove 17c and is thus prevented from coming from the groove 17c to the groove 17e. During the mode change-over, the slide switch 12 is held in place as shown in FIG. 9(B) by causing a ball 25 which engages a hole 11f provided in the lens body 11 under the pressure of a compression coil spring 26 to fall into either of two bottoms of a mountain-shaped notched part 12e.

Further, a mode display mechanism is arranged as follows: The slide switch 12 which is made of a conductor is arranged to have its bottom always in contact with an electrode 27a which is secured to the lens body 11. One of the electrode end faces 12c and 12d of the slide switch 12 comes into contact with one of electrodes 27b and 27c which are connected respectively to display lamps 13a and 13b when one mode is selected. One of the display lamps then lights up to indicate the mode selected.

FIG. 12 shows the appearance of a remote control box which is to be operated when the electrical selection or change-over of the conversion lens unit is selected by turning on the manual/electrical change-over switch 14. FIG. 13 is a block diagram showing the operation of the remote control box. The remote control box is provided with a remote control box body 31. A connector 32 with a cable is connected to the lens body 11. When a 16:9/4:3 mode signal is received from the lens body 11, the mode selected is displayed (not shown) on the box. With the mode signal received, an instruction signal is given from the remote control box according to the mode signal to the lens body 11 by pushing a push switch 33. The instruction signal instructs the lens body 11 to select, for example, 1 magnification (1×) or 2 magnifications (2×) if the 16:9 mode is selected, or 1 magnification (1×), 1.2 magnifications (1.2×) or 2.4 magnifications (2.4×) in the case of the 4:3 mode. Then, at the same time, one of display lamps 34a, 34b and 34c or one of display lamps 35a and 35b is lighted up within the remote control box as applicable. The instruction signal sent from the remote control box to the lens body 11 is inputted to the conversion lens unit driving circuit 28 to be compared with a signal from the conversion lens unit position sensor 18. If the instruction signal and the signal from the conversion lens unit position sensor 18 differ from each other, a voltage is applied to the turret driving motor 19 to cause the turret 17 to rotate. The voltage application to the turret driving motor 19 is brought to a stop when the two signals come to coincide with each other. The conversion lens unit driving circuit 28 also receives a signal from the mode change-over switch 12. If the mode is not established (with the change-over switch being still in process of operation), no voltage is applied to the turret driving motor 19.

A third embodiment of this invention includes the same conversion lens units as the second embodiment described above. The third embodiment, however, includes no means for restricting the selection of the conversion lens units in the lens body and is arranged to permit electrical change-over by means of a remote control box. The remote control box includes a 16:9/4:3 change-over slide switch, mode display lamps and a three-position toggle switch for selection of the conversion lens units. This switch is provided with mechanical means for inhibiting selection of a 1-magnification optical system when the 4:3 mode is selected.

Figure 14B:
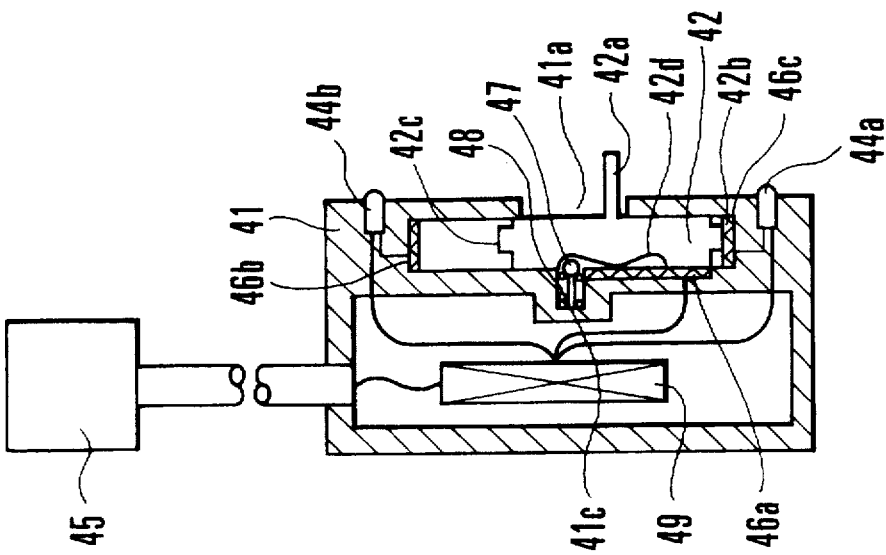
FIGS. 14(A) to 14(E) show essential parts of a change-over operation part provided for conversion lens units arranged in a third embodiment of this invention.
Figure 14A:
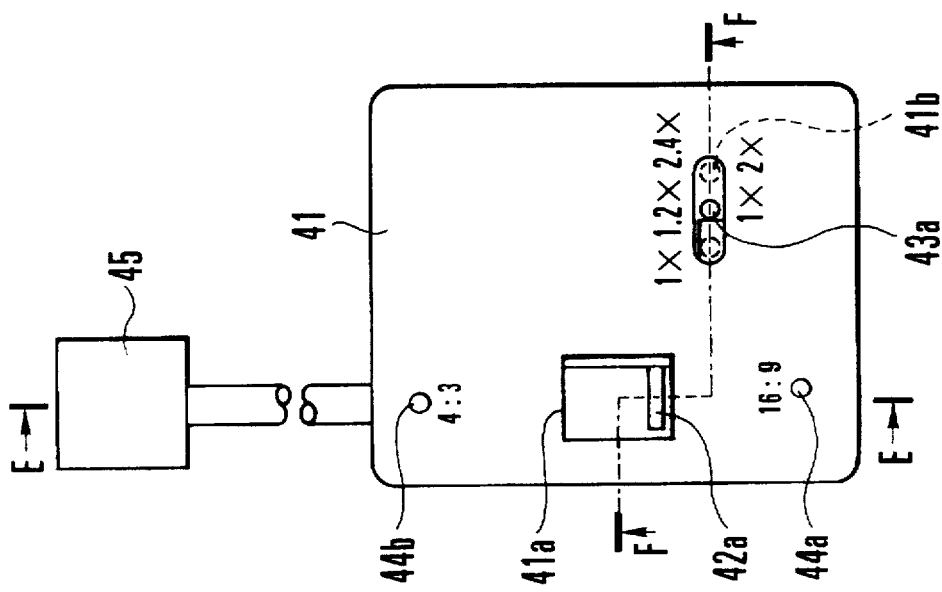
Figure 14E:
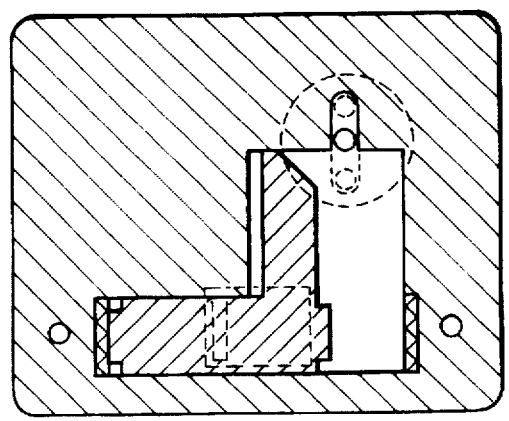
Figure 14D:
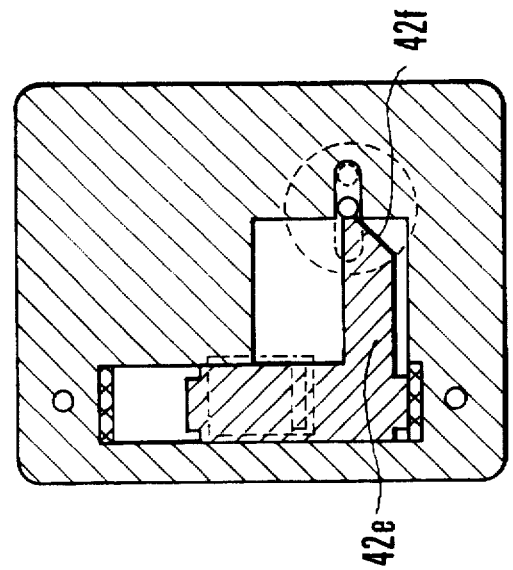
Figure 14C:
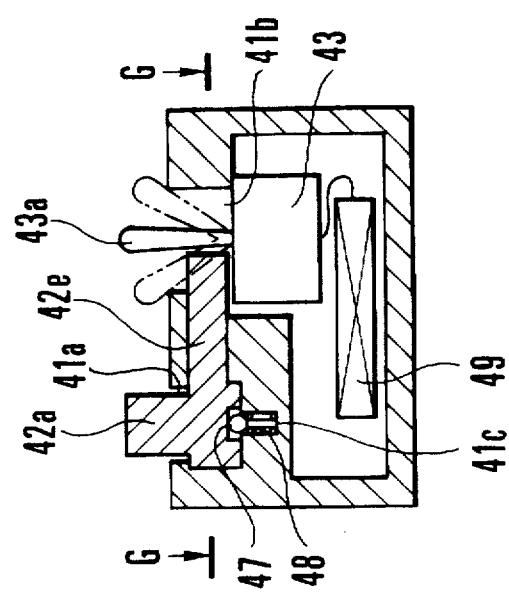

The third embodiment is arranged as shown in FIGS. 14(A) to 14(E). FIG. 14(A) shows the appearance of an operation panel. FIG. 14(B) is a sectional view taken along a line E—E of FIG. 14(A). FIG. 14(C) is a sectional view taken along a line F—F of FIG. 14(A). FIGS. 14(D) and 14(E) are sectional views both of which are taken along a line G—G of FIG. 14(C).

The remote control box is provided with a remote control box body 41. A slide switch 42 is provided for 16:9/4:3 mode change-over selection. A position toggle switch 43 is provided for selection of one of the conversion lens units. Change-over levers 42a and 43a protrude respectively through holes 41a and 41b provided in the remote control box body 41. Mode display lamps 44a and 44b are provided for displaying the mode selected. A connector 45 which is provided with a cable is connected to the lens body. Through this connector 45, a 16:9/4:3 mode instruction signal and a conversion lens unit position instruction signal from an electric circuit 49 are transmitted to the lens body. The mechanisms for switching, holding the slide switch 42 and lighting the display lamps are the same as the second embodiment.

As shown in FIG. 14(D), the slide switch 42 has a lever 42e which protrudes toward the toggle switch 43. The fore end of the lever 42e is formed into a slanting face 42f. In the case of the 16:9 mode, the slanting face 42f is located on the change-over movable plane of the toggle switch 43 to prevent change-over to an optical system which is provided solely for 1-magnification in the 4:3 mode by preventing the leftward bending of the lever 43a.

Further, as shown in FIG. 14(E), in the case of the 4:3 mode, the lever 42e is located outside of the movable plane of the toggle switch lever 43a to enable the toggle switch lever 43a to bend to the left.

When the slide switch 42 is switched from a 1-magnification selecting state in the 4:3 mode over to the 16:9 mode, the slanting face 42f pushes the lever 43a to raise the lever 43a from its leftward bent state into an upright state, so that the change-over of the conversion lens unit to 1-magnification optical system can be forcibly effected at the same time as the mode selection.

Figure 15:
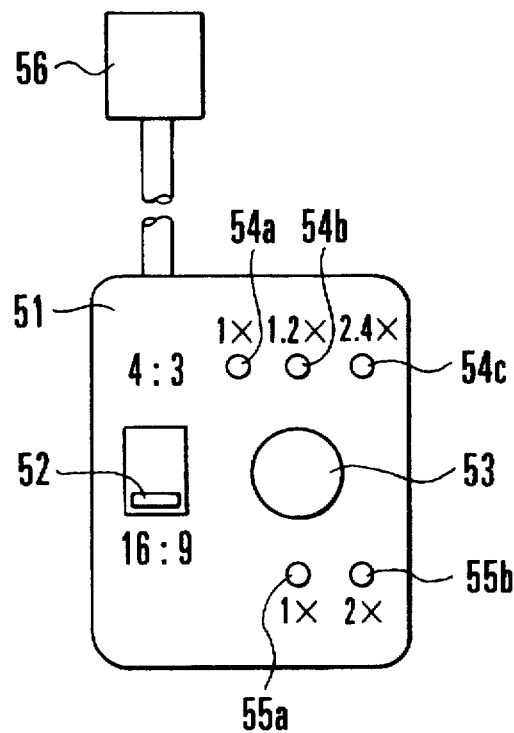
FIG. 15 shows a control box provided for a change-over operation on conversion lens units arranged in a fourth embodiment of this invention.
Figure 16:
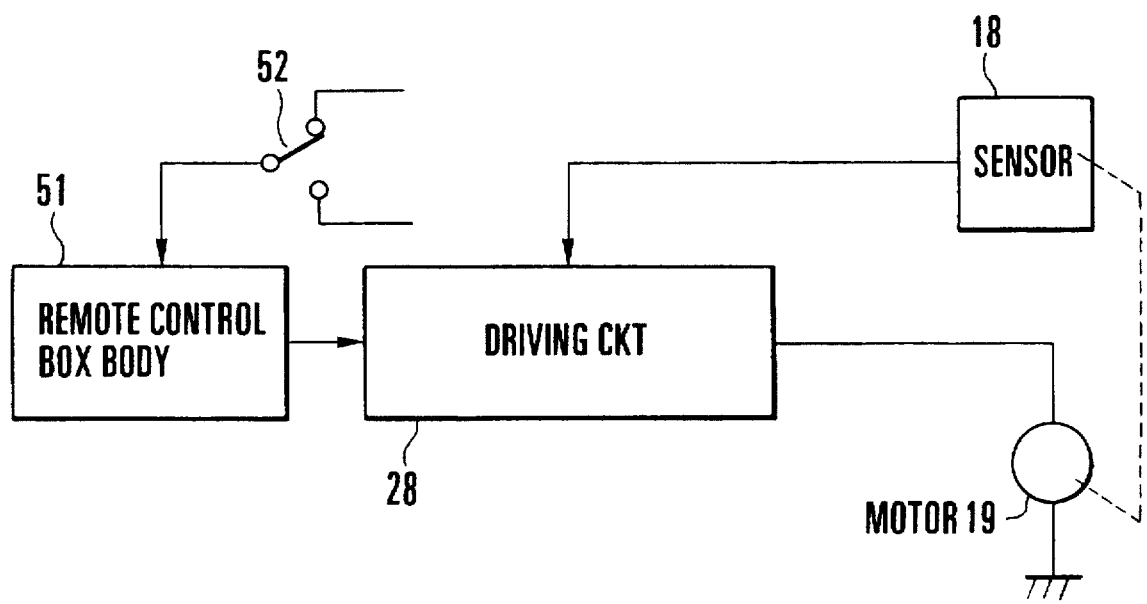
FIG. 16 is a block diagram showing the electrical arrangement in the control box of FIG. 15.

A fourth embodiment of this invention is arranged to have the same optical system of the conversion lens units within the lens body in the same manner as the second embodiment described in the foregoing. The fourth embodiment, however, has no means for restricting the selection of the conversion lens units within the lens body and is arranged to permit only electrical change-over by using a remote control box. FIG. 15 shows a remote control box and FIG. 16 shows in a block diagram the operation of the remote control box. The remote control box includes a slide switch for 16:9/4:3 mode change-over, mode display lamps (not shown), a push switch for conversion lens unit selection and an instruction signal display lamp. The fourth embodiment is characterized in that the remote control box further includes means for electrically inhibiting in the 16:9 mode the selection of the 1-magnification optical system of the 4:3 mode.

Referring to FIGS. 15 and 16, the remote control box is provided with a remote control box body 51. A connector 56 with a cable is connected to the lens body.

A mode display lamp which is selected from among a group of mode display lamps according to a mode signal from the mode change-over slide switch 52 is caused to light up. When a push switch 53 which is provided for selection of one of the conversion lens units is pushed, the remote control box sends to the lens body, according to the mode signal, an instruction signal for selecting 1 magnification or 2 magnifications, in the 16:9 mode, or for selecting 1, 1.2 or 2.4 magnifications in the case of the 4:3 mode. At the same time, one of display lamps 54a, 54b and 54c or one of display lamps 55a and 55b which are provided within the remote control box is caused to light up as applicable. The instruction signal sent from the remote control box to the lens body is inputted to a conversion lens unit driving circuit 28 to be compared with a signal from a sensor 18 which is arranged to detect the positions of the conversion lens units. If the instruction signal and the signal from the position sensor 18 differ from each other, a voltage is applied to a turret driving motor 19 to cause the turret to be rotated. When the two signals come to coincide, the voltage application to the motor 19 is brought to a stop to bring the rotation of the turret to a stop. The instruction signal from the remote control box is outputted according to each mode. Therefore, even if the conversion lens unit of 1 magnification has been selected in the 4:3 mode, when the position of the mode change-over slide switch 52 is shifted to the 16:9 mode, the instruction signal changes to a 1-magnification instruction signal which corresponds to the 16:9 mode. Therefore, a conversion lens unit of 1 magnification for the 16:9 mode is forcibly selected in this instance.

According to the arrangement of the first to fourth embodiments of this invention, as described above, a camera can be arranged to be capable of converting the image pickup area of the aspect ratio of 16:9 of its image sensor into the image pickup area of the aspect ratio of 4:3 and vice versa without causing any change in the angle of view of the photo-taking lens thereof.

Further, in a case where a mode of shooting at an image size having a large aspect ratio is designated, for example, the use of a conversion lens unit which makes the image size smaller is inhibited, so that either a light flux obtained by a zoom lens is effectively prevented from being eclipsed or the necessity of use of a larger zoom lens can be prevented.

Figure 17:
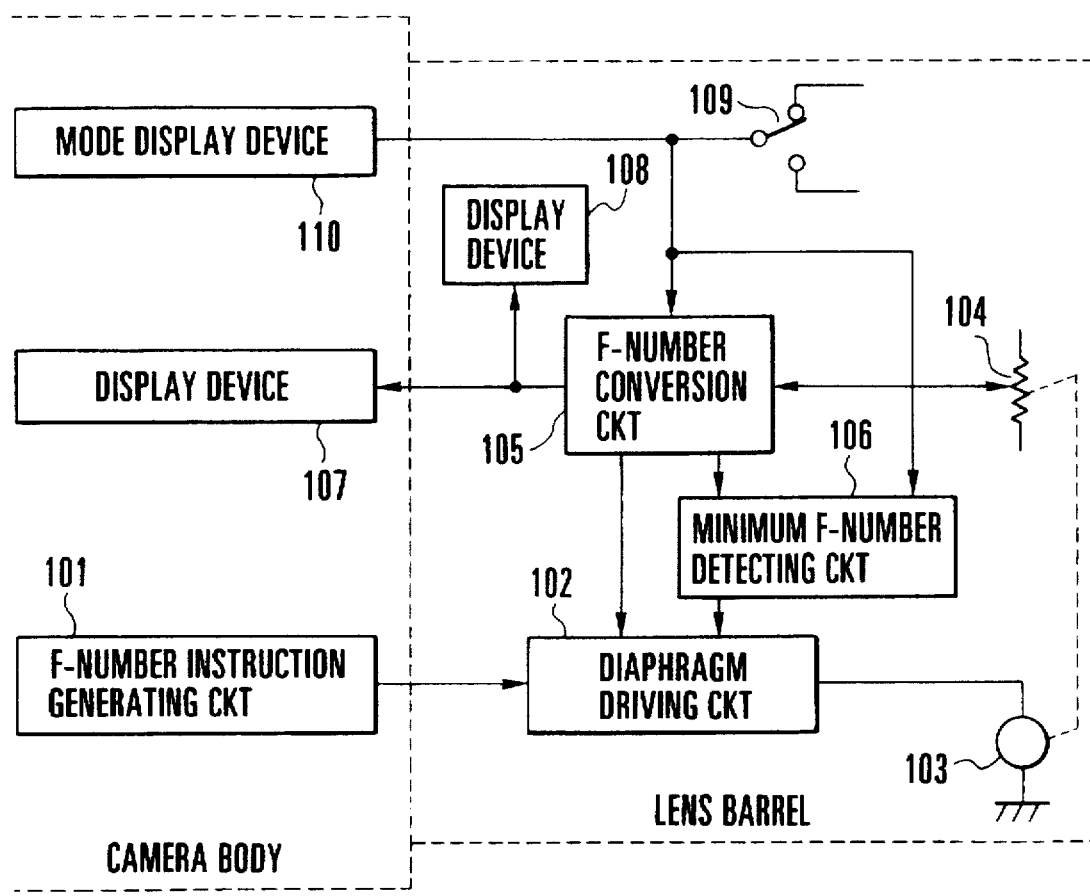
FIG. 17 is a block diagram showing the circuit arrangement of a fifth embodiment of this invention.

FIG. 17 shows a circuit arrangement of a camera system arranged as a fifth embodiment of this invention.

Referring to FIG. 17, the output of an F-number instruction signal generating circuit 101 is connected to a diaphragm driving circuit 102. The output of the diaphragm driving circuit 102 is connected to a driving motor 103 which is arranged to drive a diaphragm. A lens barrel includes an aperture diameter detector 104 which is arranged to detect the diameter of the aperture of the diaphragm. The output of the aperture diameter detector 104 is connected to an F-number conversion circuit 105. The output of the F-number conversion circuit 105 is not only directly connected to the diaphragm driving circuit 102 but also indirectly connected to the latter through a minimum F-number detecting circuit 106. The output of the F-number conversion circuit 105 is further connected to an F-number display device 107 which is disposed on the side of a TV camera body and also to an F-number display device 108 which is disposed on the side of the lens barrel.

Within the lens barrel, there is provided a mode change-over switch 109 which has two mode positions for an aspect ratio of 16:9 and another aspect ratio of 4:3. The output of the mode change-over switch 109 is connected to the F-number conversion circuit 105, to the minimum F-number detecting circuit 106 and also to a mode display device 110 which is arranged to always display the mode of the mode change-over switch 109.

Assuming that the 16:9 (aspect ratio) mode is selected by the mode change-over switch 109, when an instruction signal is inputted from the F-number instruction signal generating circuit 101 to the diaphragm driving circuit 102, the instruction signal is compared with the value of an F-number currently inputted from the F-number conversion circuit 105 also to the diaphragm driving circuit 102. If the two input signals do not coincide with each other, a driving signal indicating a direction in which the two signals will be caused to coincide with each other is outputted to the driving motor 103. The driving motor 103 then causes the aperture of the lens to vary according to the driving signal.

Figure 18:
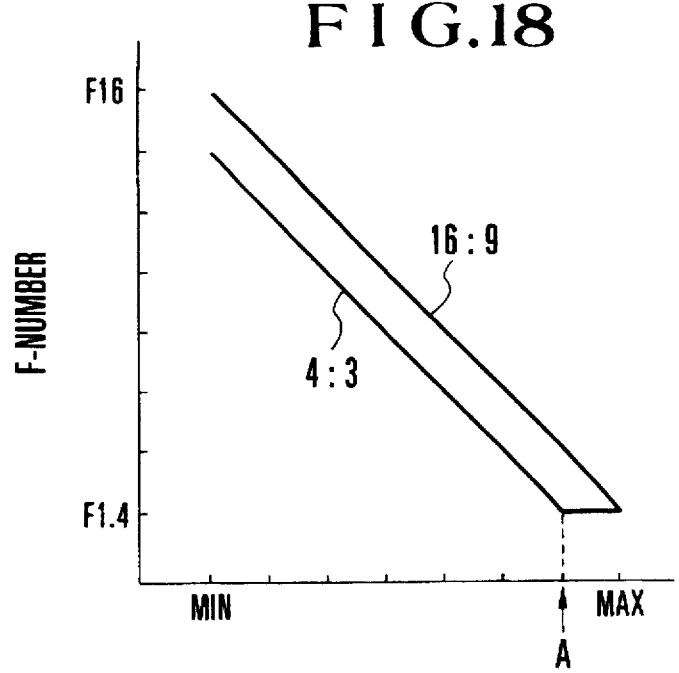
FIG. 18 is a graph showing a relation between aperture diameters and F-numbers of the fifth embodiment.

Next, the aperture diameter detector 104 outputs a diaphragm aperture value to the F-number conversion circuit 105. Then, in accordance with a relation which is shown in FIG. 18, the F-number conversion circuit 105 converts the diaphragm aperture value into an F-number value corresponding to the aspect ratio of 16:9. This F-number value is fed back to the diaphragm driving circuit 102. When the F-number comes to coincide with the instruction signal, the diaphragm driving circuit 102 stops the driving motor 103. The F-number value thus obtained is then displayed respectively by the F-number display device 107 which is disposed on the side of the TV camera body and the F-number display device 108 which is disposed on the side of the lens barrel.

Further, if the value of the instruction signal inputted to the diaphragm driving circuit 102 is smaller than the minimum F-number of the lens, the minimum F-number detecting circuit 106 supplies a stop signal to the diaphragm driving circuit 102 when the aperture value of the diaphragm decreases to its minimum F-number position. Upon receipt of the stop signal, the diaphragm driving circuit 102 forcibly brings the driving motor 103 to a stop.

In a case where the 4:3 mode is selected by the mode change-over switch 109, the diameter of the diaphragm aperture is adjusted by the driving motor 103 under feedback control in accordance with an instruction signal from the F-number instruction signal generating circuit 101 in the same manner as in the case of the 16:9 mode. However, in this case, the F-number conversion circuit 105 converts the aperture diameter into an F-number which corresponds to the 4:3 mode as shown in FIG. 18 and the F-number thus obtained is supplied to the diaphragm driving circuit 102. Further, when the value of the F-number reaches a value A which is the minimum F-number as shown in FIG. 18, the minimum F-number detecting circuit 106 supplies a stop signal to the diaphragm driving circuit 102 to have the driving motor 103 forcibly stopped.

The aperture diameter is thus converted into an F-number by using a function which varies according to the selection of the 16:9 mode or the 4:3 mode. By virtue of this arrangement, the adjustment of the diaphragm aperture diameter can be brought to a stop at a minimum F-number value which is used in common for the different modes.

Figure 19:
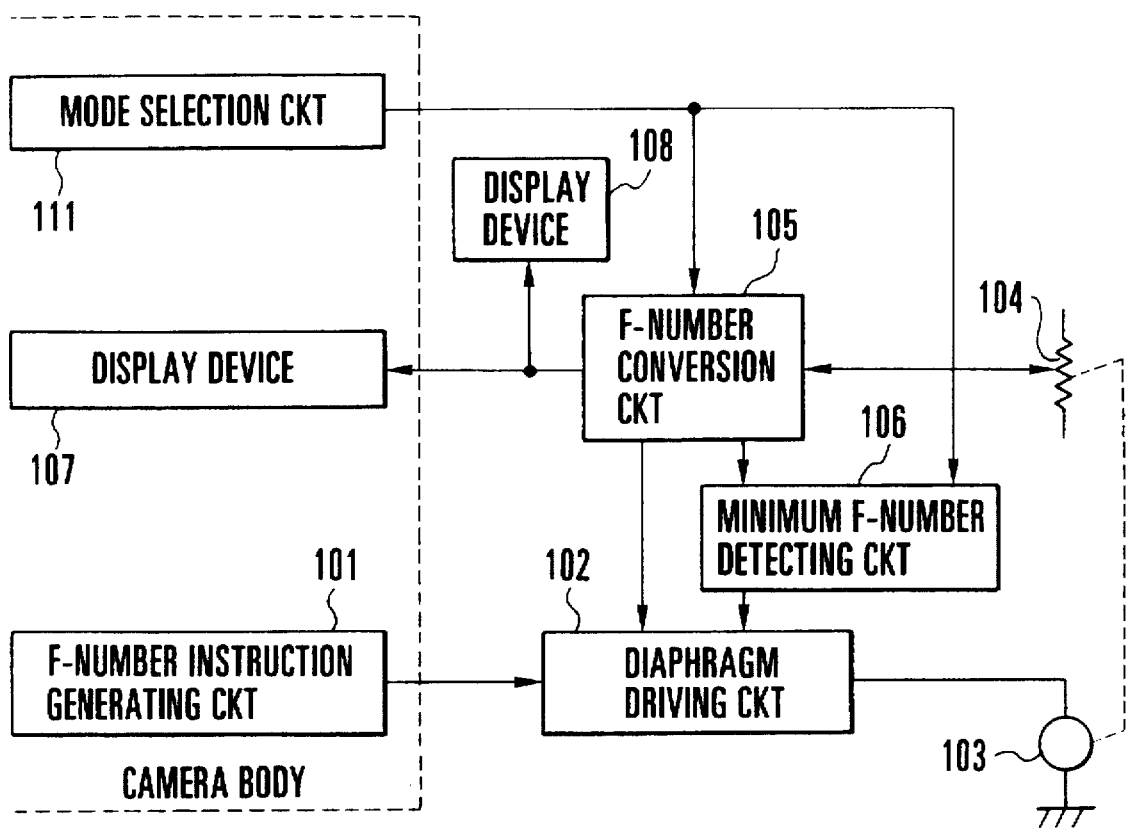
FIG. 19 is a block diagram showing the arrangement of a modification of the fifth embodiment.

FIG. 19 shows by way of example the arrangement of a modification of the fifth embodiment. In this case, the mode change-over switch 109 and the mode display device 110 which are shown in FIG. 17 are omitted. In place of them, a mode selection circuit 111 is provided within the TV camera body. The output of the mode selection circuit 111 is connected to the F-number conversion circuit 105 and the minimum F-number detecting circuit 106. Information on the aspect ratio mode can be supplied to the F-number conversion circuit 105 and the minimum F-number detecting circuit 106 also by this arrangement. The modification, therefore, gives the same advantageous effect as the fifth embodiment.

Figure 20:
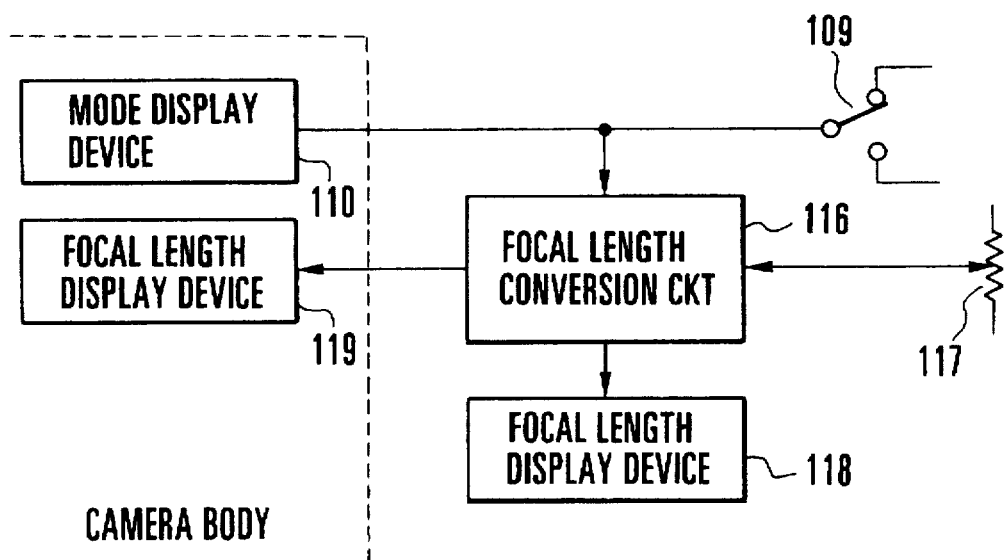
FIG. 20 is a block diagram showing the arrangement of a sixth embodiment of this invention.

FIG. 20 shows the arrangement of a sixth embodiment of this invention which is contrived with attention given to the focal length. In FIG. 20, the same reference numerals as those used in FIG. 17 denote the same parts as those shown in FIG. 17. The mode signal of the mode change-over switch 109 is arranged to be supplied to a focal length conversion circuit 116. To the focal length conversion circuit 116 is connected the output of a zoom position detector 117 which is arranged to detect a zoom position in synchronism with the zooming movement of the lens. The output of the focal length conversion circuit 116 is connected to focal length display devices 118 and 119 which are disposed respectively within the camera body and within the lens barrel.

Figure 21:
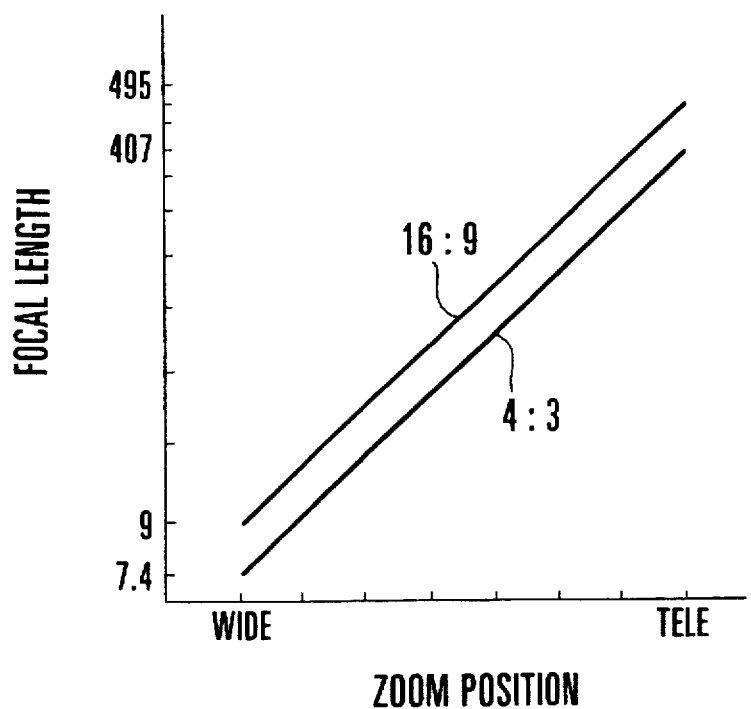
FIG. 21 is a graph showing a relation between zoom positions and focal length of the sixth embodiment.

With the sixth embodiment arranged in this manner, when the mode change-over switch 109 is set in a position for the 16:9 mode, a zoom position signal from the zoom position detector 117 is inputted to the focal length conversion circuit 116 to be converted into a focal length corresponding to the 16:9 mode in accordance with a relation which is shown in FIG. 21. In this instance, the value of the focal length thus obtained is inputted to the focal length display devices 118 and 119 to be displayed respectively by these display devices.

Under this condition, when the mode change-over switch is set in another position for the 4:3 mode, a function to be used for conversion by the focal length conversion circuit 116 is shifted to a function which corresponds to the 4:3 (aspect ratio) mode. As a result, a focal length thus obtained is at a value which is located closer to the wide-angle end position of the zoom lens than the focal length obtained in the 16:9 mode for the same zoom position.

Figure 22:
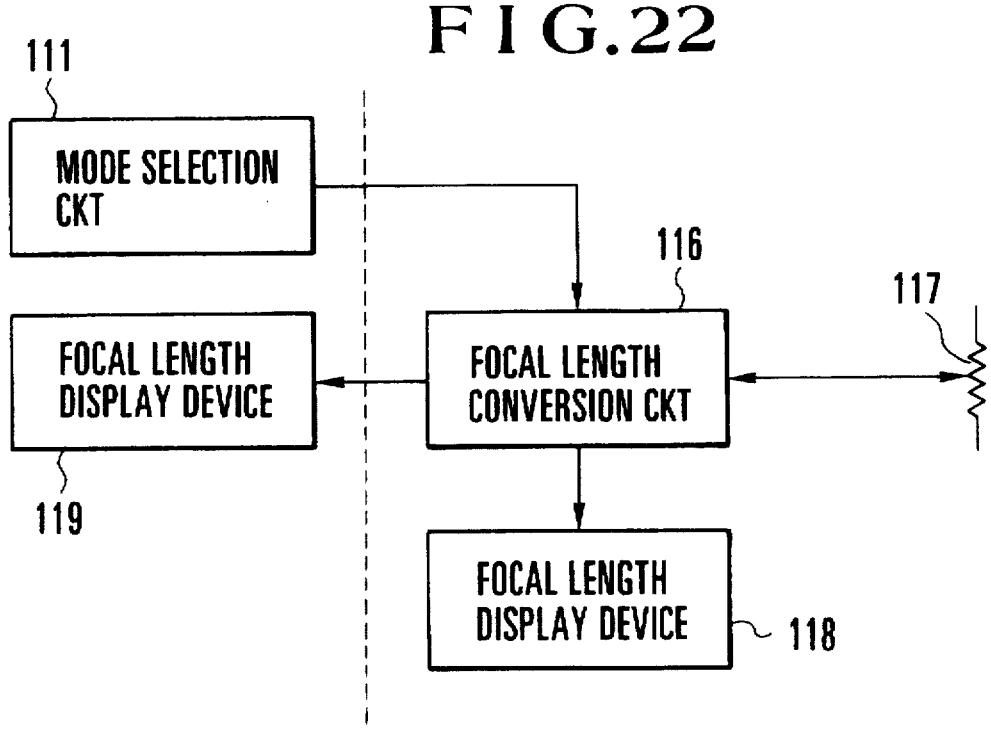
FIG. 22 is a block diagram showing the arrangement of a modification of the sixth embodiment.

FIG. 22 shows by way of example the arrangement of a modification of the sixth embodiment of this invention. This modification is provided with a mode selection circuit 111 which is arranged in place of the mode change-over switch 109 and a mode display device 110 which are shown in FIG. 20. The mode signal of the mode selection circuit 111 is arranged to be supplied to the focal length conversion circuit 116. Therefore, the same advantageous effect as that of the sixth embodiment is attainable by setting any of the aspect ratio modes at the mode selection circuit 111.

Figure 23:
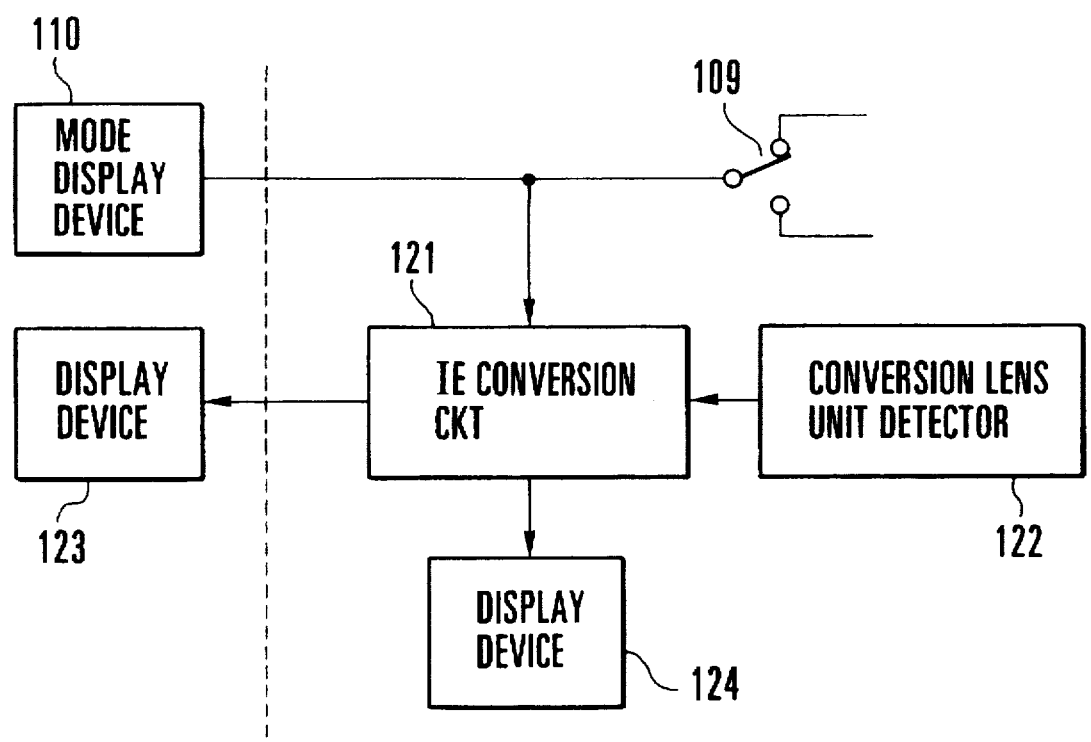
FIG. 23 is a block diagram showing the arrangement of a seventh embodiment of this invention.

FIG. 23 shows the arrangement of a seventh embodiment of this invention. In this case, the output of the mode change-over switch 109 is connected to an extender lens (IE) conversion circuit 121. To the extender lens conversion circuit 121 is connected the output of a conversion lens unit detector 122 which is arranged to detect a conversion lens unit selected. The output of the extender lens conversion circuit 121 is connected to extender lens display devices 123 and 124.

Figure 24:
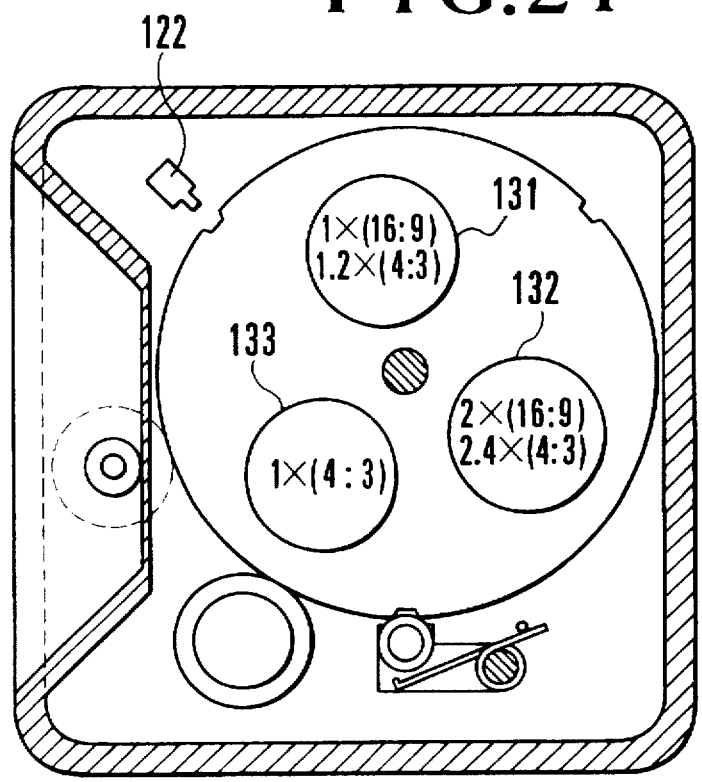
FIG. 24 is a sectional view showing a turret arranged within a lens of the seventh embodiment.

FIG. 24 is a sectional view showing a turret part disposed within the lens. Three different conversion lens units are arranged on the turret. The lens units includes a conversion lens unit 131 which is arranged to cause an extender lens to give 1 magnification in the 16:9 mode and 1.2 magnifications in the 4:3 mode, a conversion lens unit 132 which is arranged to cause the extender lens to give 2 magnifications in the 16:9 mode and 2.4 magnifications in the 4:3 mode, and an optical system 133 which is provided solely for causing the extender lens to give 1 magnification in the 4:3 mode.

Assuming that the mode change-over switch 109 is currently set for the 16:9 mode, if, for example, a signal indicating the selection of the conversion lens unit 131 is inputted from the conversion lens unit detector 122 to the extender lens conversion circuit 121, the extender lens conversion circuit 121 decides 1 magnification in the 16:9 mode and outputs the result of this decision. In accordance with the output, the extender lens display devices 123 and 124 respectively make displays showing that the extender lens is at 1 magnification.

When the mode change-over switch 109 is switched in this state to the 4:3 mode, the extender lens conversion circuit 121 decides that the extender lens is at 1.2 magnifications and changes its output from 1 magnification to 1.2 magnifications and supplies it to the extender lens display devices 123 and 124 which are disposed respectively on the side of the camera body and on the side of the lens barrel. In a case where the conversion lens unit 132 or the optical system 133 is selected, the operation is performed in the same manner and, according to a mode signal from the mode change-over switch 109, a value of the extender lens corresponding to the mode and to the conversion lens unit selected is displayed by the extender lens display devices 123 and 124.

Figure 25:
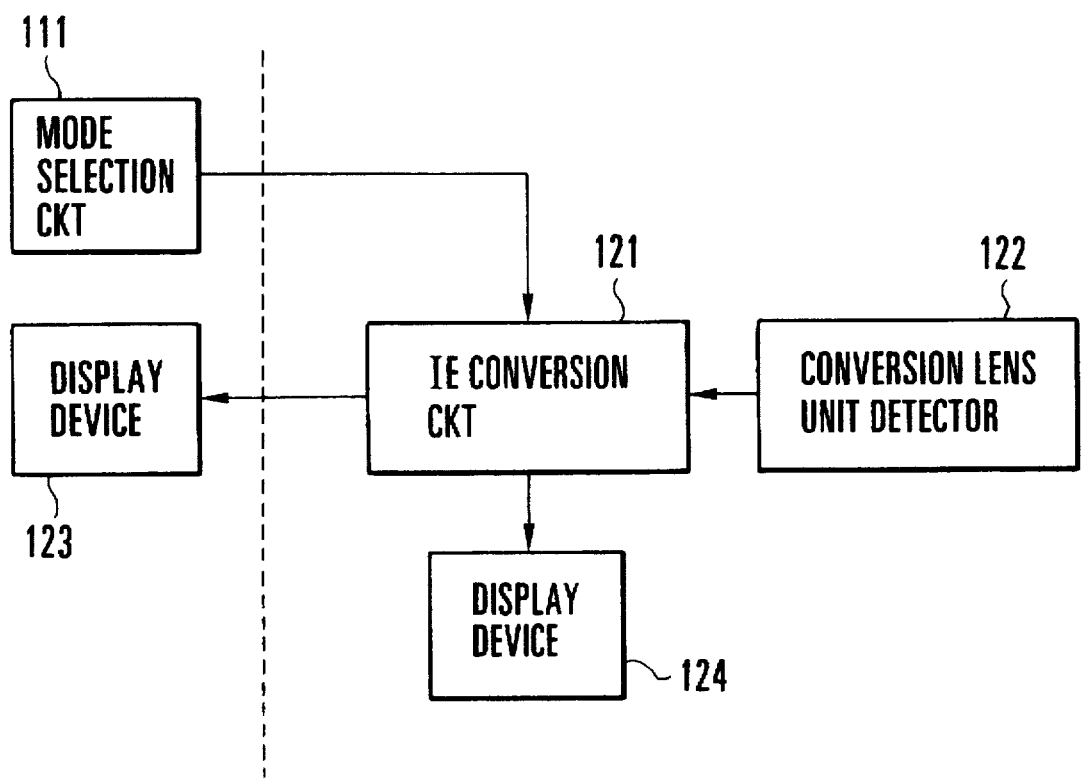
FIG. 25 is a block diagram showing the arrangement of a modification of the seventh embodiment.

FIG. 25 shows by way of example the arrangement of a modification of the seventh embodiment of this invention. The modification is provided with a mode selection circuit 111 which is arranged in place of the F-number display device 108 and the mode display device 110. The output of the mode selection circuit 111 is connected to the extender lens conversion circuit 121. This arrangement enables the modification to give the same advantageous effect as the seventh embodiment.

As described above, the zoom lens of each of the fifth, sixth and seventh embodiments is arranged such that, in obtaining the value of F-number from an aperture diameter, the F-number is converted by using a function which corresponds to the mode of the aspect ratio of the image format selected. Therefore, the F-number value can be always accurately obtained irrespective of any change in the aspect ratio, so that the zoom lens can be controlled on the basis of the F-number thereof.

Further, in obtaining a focal length from a zoom position, the arrangement to make conversion by using a function corresponding to the mode of the aspect ratio of the image format enables the embodiment to always accurately display the focal length irrespective of changes in the aspect ratio mode.

Further, in obtaining an extender lens of the conversion lens unit selected, the extender lens is obtained according to the mode of the aspect ratio of the image format, so that the extender lens can be always accurately displayed.

What is claimed is:

1. A camera system comprising:
   a zoom lens;
   photoelectric conversion means for photoelectrically converting an image formed by said zoom lens;

mode change-over means for changing an aspect ratio of an effective image pickup area of said photoelectric conversion means; and focal length conversion means for converting a focal length of said zoom lens according to the change-over of the aspect ratio, wherein said focal length conversion means is arranged to convert the focal length of said zoom lens so as to substantially prevent any change in angle of view from being caused by the change-over of the aspect ratio; and wherein said focal length conversion means is a lens unit arranged to be inserted into an optical path of said zoom lens.

2. A system according to claim 1, wherein said photoelectric conversion means is disposed within a camera body, and said zoom lens is disposed within a lens barrel which is detachably mountable to said camera body.

3. A system according to claim 1, wherein said lens unit is arranged to be inserted into the optical path in association with the change-over of the aspect ratio by said mode change-over means.

4. A system according to claim 1, further comprising display means for displaying a mode set by said mode change-over means.

5. A system according to claim 1, further comprising display means for displaying a focal length converted by said focal length conversion means.

6. A system according to claim 1, further comprising setting means for setting an F-number for said zoom lens, a diaphragm, and control means for controlling said diaphragm in such a way as to cause said zoom lens to be at the F-number set by said setting means by driving said diaphragm before and after said lens unit is inserted into said zoom lens.

7. A system according to claim 1, wherein said zoom lens includes a first lens unit which has a large image circle and corresponds to a first aspect ratio of the effective image pickup area and a second lens unit which has a small image circle and corresponds to a second aspect ratio of the effective image pickup area, and, when the aspect ratio is changed, one of said first and second lens units is retracted out of the optical path of said zoom lens and the other is inserted into the optical path of said zoom lens, wherein the focal length conversion means does not insert into the optical path when an aspect ratio providing a large image circle is selected.

8. A system according to claim 7, wherein, with a distance from a front principal point of said first lens unit to the position of an image point formed by a lens part located in front of said first lens unit assumed to be x1, a distance between principal points of said first lens unit and a focal length of said first lens unit, respectively, to be $\Delta H1$ and f1, a distance from a front principal point of said second lens unit to the position of the image point formed by said lens part to be x2, and a distance between principal points of said second lens unit and a focal length of said second lens unit, respectively, to be $\Delta H2$ and f2, a condition of $$\Delta H1 - x1^2/(x1+f1) = \Delta H2 - x2^2/(x2+f2)$$

is satisfied, and, with an intrinsic aspect ratio of said effective image pickup area assumed to be 16:9, when the aspect ratio is changed to an aspect ratio of 4:3, a condition of $$1.16 < (1+x2/f2)/(1+x1/f1) < 1.28$$

is satisfied.

9. A system according to claim 7, wherein, with a distance from a front principal point of said first lens unit to the position of an image point formed by a lens part located in front of said first lens unit assumed to be x1, a distance between principal points of said first lens unit and a focal length of said first lens unit, respectively, to be $\Delta H1$ and f1, a distance from a front principal point of said second lens unit to the position of the image point formed by said lens part to be x2, and a distance between principal points of said second lens unit and a focal length of said second lens unit, respectively, to be $\Delta H2$ and f2, a condition of $$\Delta H1 - x1^2/(x1+f1) = \Delta H2 - x2^2/(x2+f2)$$

is satisfied, and, with an intrinsic aspect ratio of said effective image pickup area assumed to be 4:3, when the aspect ratio is changed to an aspect ratio of 16:9, a condition of $$1.04 < (1+x2/f2)/(1+x1/f1) < 1.14$$

is satisfied.

10. A system according to claim 1, further comprising an extender lens unit for extending the focal length of said zoom lens, and a turret for supporting said focal length conversion means as well as said extender lens unit.

11. A system according to claim 1, wherein said zoom lens comprises, from the object side, at least a front lens unit, a variation lens unit which moves along an optical axix at the time of magnification variation, and a relay lens unit, and wherein said focal length conversion means is located behind said variation lens unit.

12. A zoom lens for use in a camera adapted to permit change-over of an aspect ratio of an effective image pickup area of image pickup means, comprising:

focal length conversion means for converting a focal length of said zoom lens so as to substantially prevent any change in angle of view from being caused by the change-over of the aspect ratio, wherein said focal length conversion means is a lens unit arranged to be inserted into an optical path of said zoom lens.

13. A zoom lens according to claim 12, wherein said zoom lens is detachably mountable to the camera.

14. A zoom lens according to claim 12, wherein said zoom lens includes a first lens unit which has a large image circle and corresponds to a first aspect ratio of the effective image pickup area and a second lens unit which has a small image circle and corresponds to a second aspect ratio of the effective image pickup area, and, when the aspect ratio is changed, one of said first and second lens units is retracted out of the optical path of said zoom lens and the other is inserted into the optical path of said zoom lens, wherein the focal length conversion means does not insert into the optical path when an aspect ratio providing a large image circle is selected.

15. A zoom lens according to claim 12, wherein, with a distance from a front principal point of said first lens unit to the position of an image point formed by a lens part located in front of said first lens unit assumed to be x1, a distance between principal points of said first lens unit and a focal length of said first lens unit, respectively, to be $\Delta H1$ and f1, a distance from a front principal point of said second lens unit to the position of the image point formed by said lens part to be x2, and a distance between principal points of said second lens unit and a focal length of said second lens unit, respectively, to be $\Delta H2$ and f2, a condition of $$\Delta H1 - x1^2/(x1+f1) = \Delta H2 - x2^2/(x2+f2)$$

is satisfied, and, with an intrinsic aspect ratio of said image pickup means assumed to be 16:9, when the aspect ratio is changed to an aspect ratio of 4:3, a condition of $$1.16 < (1+x2/f2)/(1+x1/f1) < 1.28$$

is satisfied.

16. A zoom lens according to claim 12, wherein, with a distance from a front principal point of said first lens unit to the position of an image point formed by a lens part located in front of said first lens unit assumed to be x1, a distance between principal points of said first lens unit and a focal length of said first lens unit, respectively, to be $\Delta H1$ and f1, a distance from a front principal point of said second lens unit to the position of the image point formed by said lens part to be x2, and a distance between principal points of said second lens unit and a focal length of said second lens unit, respectively, to $\Delta H2$ and f2, a condition of $$\Delta H1 - x1^2/(x1+f1) = \Delta H2 - x2^2/(x2+f2)$$

is satisfied, and, with an intrinsic aspect ratio of said image pickup means assumed to be 4:3, when the aspect ratio is changed to an aspect ratio of 16:9, a condition of $$1.04 < (1+x2/f2)/(1+x1/f1) < 1.14$$

is satisfied.

17. A zoom lens according to claim 12, further comprising an extender lens unit for extending the focal length of said zoom lens, and a turret for supporting said focal length conversion means as well as said extender lens unit.

18. A zoom lens according to claim 12, further comprising indication means for providing an indication corresponding to a mode of the aspect ratio.

19. A zoom lens according to claim 12, wherein said zoom lens comprises, from the object side, at least a front lens unit, a variator lens unit which moves along the optical axis at the time of magnification variation, and a relay lens unit, and wherein said focal length conversion means is located behind said variator lens unit.

20. An objective lens attachable to a camera having a variable aspect ratio in an effective image pick-up zone, comprising:

a correction lens for correcting an angle of view, said correction lens being arranged to be inserted into or retracted from an optical path so as to maintain a substantially consistent angle of view before and after change of an aspect ratio; and a holding member for holding said correction lens and an extender lens which extends a focal length of said objective lens, said holding member being arranged to rotate around a predetermined axis to insert or retract said correction lens or said extender lens into or out of the optical path.

21. A lens according to claim 20, wherein the angle of view is a diagonal angle of view.

22. A lens according to claim 20, wherein said correction lens is not inserted into the optical path under an aspect ratio having a large image circle.

23. A lens according to claim 20, further comprising indication means for indicating a focal length of said objective lens changed by the insertion of said correction lens into the optical path.

24. A lens according to claim 20, further comprising indication means for indicating an aperture value of said objective lens changed by the insertion of said correction lens into the optical path.

25. A lens according to claim 20, wherein said objective lens is a zoom lens comprising, from the object side, at least a front lens unit and a variator lens unit which moves along the optical axis at the time of magnification variation, and wherein said focal length conversion means is located behind said variator lens unit.

* * * * *

UNITED STATES PATENT AND TRADEMARK OFFICE
CERTIFICATE OF CORRECTION

PATENT NO. : 5,794,090

DATED : August 11, 1998

INVENTOR(S) : Shigeru OSHIMA, et al.

It is certified that error appears in the above-identified patent and that said Letters Patent is hereby corrected as shown below:

ON THE COVER PAGE:

At References Cited [56] U.S. Patent Documents:

"5,414,563" should read --5,414,463--.

COLUMN 2:

Line 47, "7)A)(2)" should read --7(A)(2)--.

COLUMN 14:

Line 3, "includes" should read --include--.

COLUMN 16:

Line 28, "axix" should read --axis--.
Line 55, "claim 12," should read --claim 14,--.

UNITED STATES PATENT AND TRADEMARK OFFICE
CERTIFICATE OF CORRECTION

PATENT NO. : 5,794,090

DATED : August 11, 1998

INVENTOR(S) : Shigeru OSHIMA, et al.

It is certified that error appears in the above-identified patent and that said Letters Patent is hereby corrected as shown below:

<u>COLUMN 17</u>:

Line 7, "claim 12," should read --claim 14,--.
Line 17, "to" should read --to be--.

Signed and Sealed this

Fifteenth Day of June, 1999

Attest:

Q. TODD DICKINSON

*Attesting Officer*   *Acting Commissioner of Patents and Trademarks*